(12) United States Patent
Kitajima et al.

(10) Patent No.: US 8,897,638 B2
(45) Date of Patent: Nov. 25, 2014

(54) OPTICAL PACKET SWITCHING SYSTEM

(75) Inventors: Koshi Kitajima, Kawasaki (JP); Satoshi Fukutomi, Kawasaki (JP); Wataru Kawasaki, Kawasaki (JP)

(73) Assignee: Fujitsu Telecom Networks Limited, Kawasaki-shi, Kanagawa (JP)

(*) Notice: Subject to any disclaimer, the term of this patent is extended or adjusted under 35 U.S.C. 154(b) by 282 days.

(21) Appl. No.: 13/454,882

(22) Filed: Apr. 24, 2012

(65) Prior Publication Data

US 2012/0275783 A1 Nov. 1, 2012

(30) Foreign Application Priority Data

Apr. 26, 2011 (JP) .................... 2011-098754

(51) Int. Cl.
*H04B 10/08* (2006.01)
*H04B 17/00* (2006.01)
*H04J 14/00* (2006.01)
*H04J 14/02* (2006.01)

(52) U.S. Cl.
CPC ......... *H04J 14/0212* (2013.01); *H04J 14/0267* (2013.01)
USPC .................. 398/27; 398/34; 398/45; 398/51; 398/54

(58) Field of Classification Search
CPC ............. H04J 14/0212; H04J 14/0267; H04Q 11/0062; H04Q 11/0066; H04Q 11/0005; H04Q 2011/0073; H04Q 11/0067; H04Q 2011/0039; H04Q 2011/0064; H04Q 11/00; H04Q 11/0001; H04Q 11/0071; H04Q 2011/0015; H04Q 2011/0016; H04Q 2011/002; H04Q 2011/00
USPC .................................... 398/45, 51, 54, 27, 34
See application file for complete search history.

(56) References Cited

U.S. PATENT DOCUMENTS 6,834,135 B2 * 12/2004 Yasue et al. ..................... 385/16
7,317,873 B2 * 1/2008 Aoki ............................... 398/45

(Continued)

FOREIGN PATENT DOCUMENTS

| JP | 2001-186061 A | 7/2001 |
| JP | 2008-235986 | 10/2008 |
| JP | 2010-081223 A | 4/2010 |

OTHER PUBLICATIONS

Office action for Japanese patent application No. 2011-098754 mailed by the Japanese Patent Office on Oct. 1, 2013, with English translation, 4 pages.

(Continued)

*Primary Examiner* — Ken Vanderpuye
*Assistant Examiner* — Abbas H Alagheband
(74) *Attorney, Agent, or Firm* — Christie, Parker & Hale, LLP

(57) ABSTRACT

An optical packet switching apparatus includes an optical packet switching apparatus, an optical transmitting apparatus, and an optical packet receiving apparatus. The optical packet transmitting apparatus includes a packet generator for generating a packet signal by adding the routing information to a received client signal, a BIP adding unit for adding BIP to the generated packet signal, and an electrical-to-optical converter for converting the packet signal, to which the BIP has been added, into an optical packet signal so as to be sent out. The optical packet receiving apparatus includes an electrical-to-optical converter for converting the received optical packet signal into an electrical packet signal, and a BIP comparison unit for detecting the error occurrence in the packet signal, based on the BIP added to the packet signal.

8 Claims, 21 Drawing Sheets

(56) References Cited

U.S. PATENT DOCUMENTS

| | | | |
|---|---|---|---|
| 7,831,149 B2* | 11/2010 | Sakamoto | 398/83 |
| 8,000,599 B2* | 8/2011 | Aoki | 398/25 |
| 8,195,052 B2* | 6/2012 | Ohtou et al. | 398/158 |
| 8,437,633 B2* | 5/2013 | Oda et al. | 398/34 |
| 8,638,801 B2* | 1/2014 | Sato | 370/395.51 |
| 2001/0017866 A1* | 8/2001 | Takada et al. | 370/535 |
| 2001/0050790 A1* | 12/2001 | Graves et al. | 359/110 |
| 2002/0027686 A1* | 3/2002 | Wada et al. | 359/128 |
| 2002/0131116 A1* | 9/2002 | Shimomura et al. | 359/124 |
| 2002/0131120 A1* | 9/2002 | Araki et al. | 359/139 |
| 2004/0151421 A1* | 8/2004 | Yasue et al. | 385/16 |
| 2005/0175183 A1* | 8/2005 | Ovadia et al. | 380/278 |
| 2005/0226621 A1* | 10/2005 | Kikuchi et al. | 398/83 |
| 2006/0177225 A1* | 8/2006 | Paraschis et al. | 398/87 |
| 2007/0223921 A1* | 9/2007 | Sone et al. | 398/45 |
| 2008/0095537 A1* | 4/2008 | Sakamoto | 398/83 |
| 2008/0205889 A1* | 8/2008 | Aoki | 398/51 |
| 2011/0055656 A1* | 3/2011 | Ben-Zedeff et al. | 714/752 |
| 2011/0081146 A1* | 4/2011 | Nakajima et al. | 398/48 |
| 2012/0121262 A1* | 5/2012 | Andriolli et al. | 398/49 |
| 2013/0343750 A1* | 12/2013 | Lanzone et al. | 398/34 |

OTHER PUBLICATIONS

H. Imaizumi, et al., "A Consideration of Hierarchical Header Format for Inter-AS Optical Networks", The Institute of Electronics, Information and Communication Engineers, Technical Report PN2007-77, vol. 107, No. 554, Mar. 6, 2008, pp. 21-24 (English translation of abstract only).

* cited by examiner

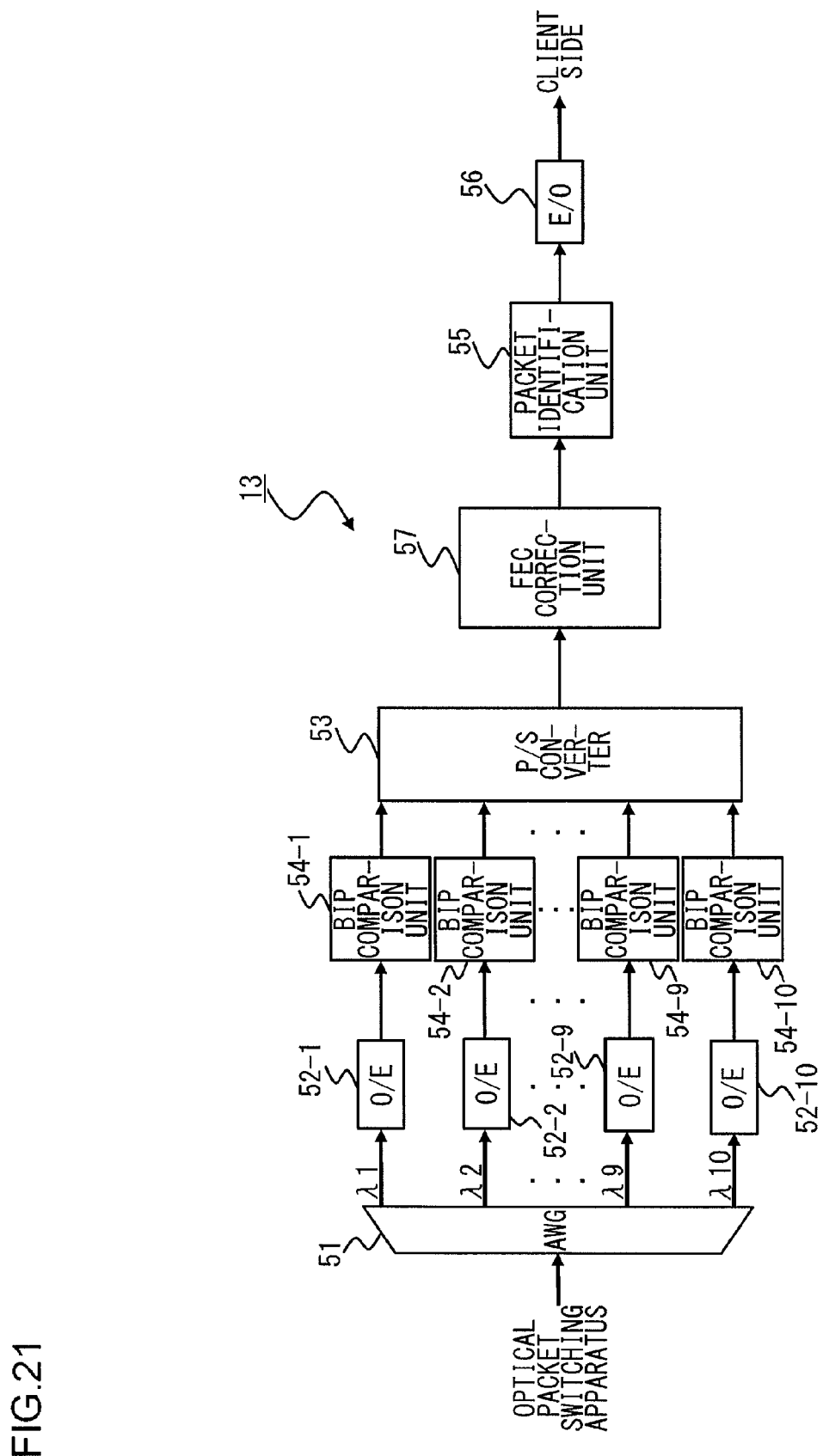

OPTICAL PACKET SWITCHING SYSTEM

CROSS-REFERENCE TO RELATED APPLICATION

This application claims priority to and the benefit of Japanese Patent Application Number 2011-098754, filed on Apr. 26, 2011, the entire disclosure of which is incorporated herein by reference.

BACKGROUND OF THE INVENTION

1. Field of the Invention

The present invention relates to an optical packet switching system which enables packet switching for each optical packet by switching an optical switch according to routing information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical packet switching apparatus (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

Related Art List (1) Japanese Unexamined Patent Application Publication No. 2008-235986.

In this optical packet switching scheme, the bit error increases when the waveform of optical packet signal degrades on account of dispersion and non-linearity of optical transmission path. Yet, no structure or mechanism with which to monitor error is available in the conventional packet switching scheme. Thus arises a problem where the signal quality in optical transmission path cannot be monitored.

SUMMARY OF THE INVENTION

The present invention has been made in view of the foregoing circumstances, and a purpose thereof is to provide an optical switching system capable of monitoring the signal quality in the optical transmission path.

In order to resolve the above-described problems, an optical packet switching apparatus according to one embodiment of the present invention includes: an optical packet switching apparatus configured to extract routing information from an inputted optical packet signal and configured to switch a route of the packet signal; an optical transmitting apparatus configured to generate an optical packet signal by adding the routing information to a received client signal and configured to send out the generated optical packet signal to the optical packet switching apparatus; an optical packet receiving apparatus configured to receive the optical packet signal sent out from the optical packet switching apparatus. The optical packet transmitting apparatus includes: a packet generator configured to generate a packet signal by adding the routing information to the received client signal; a packet quality information adding unit configured to add packet quality information, by which to detect error occurrence in the packet signal, to the generated packet signal; and an electrical-to-optical converter configured to convert the packet signal, to which the packet quality information has been added, into an optical packet signal and configured to send out the converted optical packet signal. The optical packet receiving apparatus includes: an optical-to-electrical converter configured to convert the received optical packet signal into an electrical packet signal; and a packet quality detector configured to detect error occurrence in the packet signal, based on the packet quality information added to the packet signal.

The optical packet transmitting apparatus may further include: a serial/parallel converter configured to convert the inputted packet signal into a plurality of divided packet signals, the serial/parallel converter being provided subsequent to the packet quality information adding unit; a plurality of the electrical-to-optical converters provided subsequent to the serial/parallel converter; and a wavelength multiplexing unit configured to multiplex optical packet signals of a plurality of wavelengths outputted from the plurality of the electrical-to-optical converters. The optical packet receiving apparatus may further include: a wavelength division unit configured to demultiplex the received wavelength-multiplexed optical packet signal into optical packets of a plurality of wavelengths; and a plurality of the optical-to-electrical converters provided subsequent to the wavelength division unit; and a parallel/serial converter configured to convert the plurality of divided packet signals from the plurality of the electrical-to-optical converters into a serial packet signal, the parallel/serial converter being provided anterior to the packet quality detector.

The optical packet transmitting apparatus may further include: a serial/parallel converter configured to convert the inputted packet signal into a plurality of divided packet signals; a plurality of the packet quality information adding units provided subsequent to the serial/parallel convert; a plurality of the electrical-to-optical converters provided subsequent to the plurality of the packet quality information adding units; and a wavelength multiplexing unit configure to multiplex optical packet signals of a plurality of wavelengths outputted from the plurality of the electrical-to-optical converters. The optical packet receiving apparatus may further include: a wavelength division unit configured to demultiplex the received wavelength-multiplexed optical packet signal into optical packets of a plurality of wavelengths; and a plurality of the optical-to-electrical converters provided subsequent to the wavelength division unit; a plurality of the packet quality detectors provided subsequent to the plurality of the optical-to-electrical converters; and a parallel/serial converter configured to convert the plurality of divided packet signals from the plurality of the packet quality detectors into a serial packet signal.

The packet quality information adding unit may include a BIP (bit interleaved parity) adding unit for computing bit interleaved parity of the inputted divided packet signal and for adding a computation result to the packet signal as the packet quality information. The packet quality detector may include a BIP comparison unit for detecting a bit error rate of the packet signal in such a manner that a bit interleaved parity added to the inputted divided packet signal and the bit interleaved parity computed for the inputted packet signal are compared with each other.

The packet quality information adding unit may include an FEC adding unit for adding an FEC (forward error correction) code to the inputted packet signal as the packet quality information. The packet quality detector may include an FEC correction unit for detecting the bit error rate of the inputted packet signal based on the FEC code added to the inputted packet signal and for correcting a bit error of the packet signal.

The packet quality information adding unit may include: a BIP (bit interleaved parity) adding unit for computing bit interleaved parity of the inputted divided packet signal and for adding a computation result to the packet signal as the packet quality; and an FEC adding unit for adding an FEC code to the inputted packet signal as the packet quality information, wherein the BIP adding unit and the FEC adding unit may be provided in series with each other. The packet quality detector may include: a BIP comparison unit for detecting a bit error rate of the packet signal in such a manner that a bit interleaved parity added to the inputted divided packet signal and the bit interleaved parity computed for the inputted packet signal are compared with each other; and an FEC correction unit for detecting the bit error rate of the inputted packet signal based on the FEC code added to the inputted packet signal and for correcting a bit error of the packet signal, wherein the BIP comparison detector and the FEC correction unit may be provided in series with each other.

The packet quality information adding unit may include: a BIP (bit interleaved parity) adding units for computing bit interleaved parity of the inputted divided packet signal and for adding a computation result to the packet signal as the packet quality; and an FEC adding unit for adding an FEC code to the inputted packet signal as the packet quality information, wherein the BIP adding unit and the FEC adding unit may be provided in parallel with each other. The packet quality detector may include: a BIP comparison unit for detecting a bit error rate of the packet signal in such a manner that a bit interleaved parity added to the inputted divided packet signal and the bit interleaved parity computed for the inputted packet signal are compared with each other; and an FEC correction unit for detecting the bit error rate of the inputted packet signal based on the FEC code added to the inputted packet signal and for correcting a bit error of the packet signal, wherein the BIP comparison detector and the FEC correction unit may be provided in parallel with each other.

The optical packet transmitting apparatus may further include a first operation control unit configured to activate either the BIP adding unit or the FEC adding unit. The optical packet receiving unit may further include a second operation control unit configured to activate either the BIP comparison unit or the FEC correction unit.

The optical packet transmitting apparatus may further include: a serial/parallel converter configured to convert the inputted packet signal into a plurality of divided packet signals; a plurality of the electrical-to-optical converters configured to convert a plurality of divided packet signals into optical packet signals of a plurality of wavelengths; and a wavelength multiplexing unit configured to multiplex optical packet signals of a plurality of wavelengths outputted from the plurality of the electrical-to-optical converters. The packet quality information adding unit may include: an FEC adding unit for adding an FEC code to the inputted packet signal as the packet quality information, the FEC adding unit being provided anterior to the serial/parallel converter; and a plurality of BIP (bit interleaved parity) adding units for computing bit interleaved parity of the inputted divided packet signals and for adding a computation result to the divided packet signals as the packet quality information, the plurality of BIP adding units being provided subsequent to the serial/parallel converter. The optical packet receiving apparatus may further include: a wavelength division unit configured to demultiplex the received wavelength-multiplexed optical packet signal into optical packet packets of a plurality of wavelengths; and a plurality of the optical-to-electrical converters configured to output a plurality of divided packet signals, the plurality of the optical-to-electrical converters being provided subsequent to the wavelength division unit; and a parallel/serial converter configured to convert the plurality of inputted divided packet signals into a serial packet signal. The packet quality detector may include: a BIP comparison unit, provided anterior to the parallel/serial converter, for detecting a bit error rate of the divided packet signals in such a manner that a bit interleaved parity added to the inputted divided packet signals and the bit interleaved parity computed for the inputted packet signals are compared with each other; and an FEC correction unit, provided subsequent to the parallel/serial converter, for detecting the bit error rate of the packet signal based on the FEC code added to the inputted packet signal and for correcting a bit error of the packet signal.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 21 illustrates a structure of an optical packet receiving apparatus according to an eighth embodiment of the present invention.

DETAILED DESCRIPTION OF THE INVENTION

The invention will now be described by reference to the preferred embodiments. This does not intend to limit the scope of the present invention, but to exemplify the invention.

Embodiments of the present invention will be hereinbelow described with reference to Drawings.

(First Embodiment)

Figure 1:
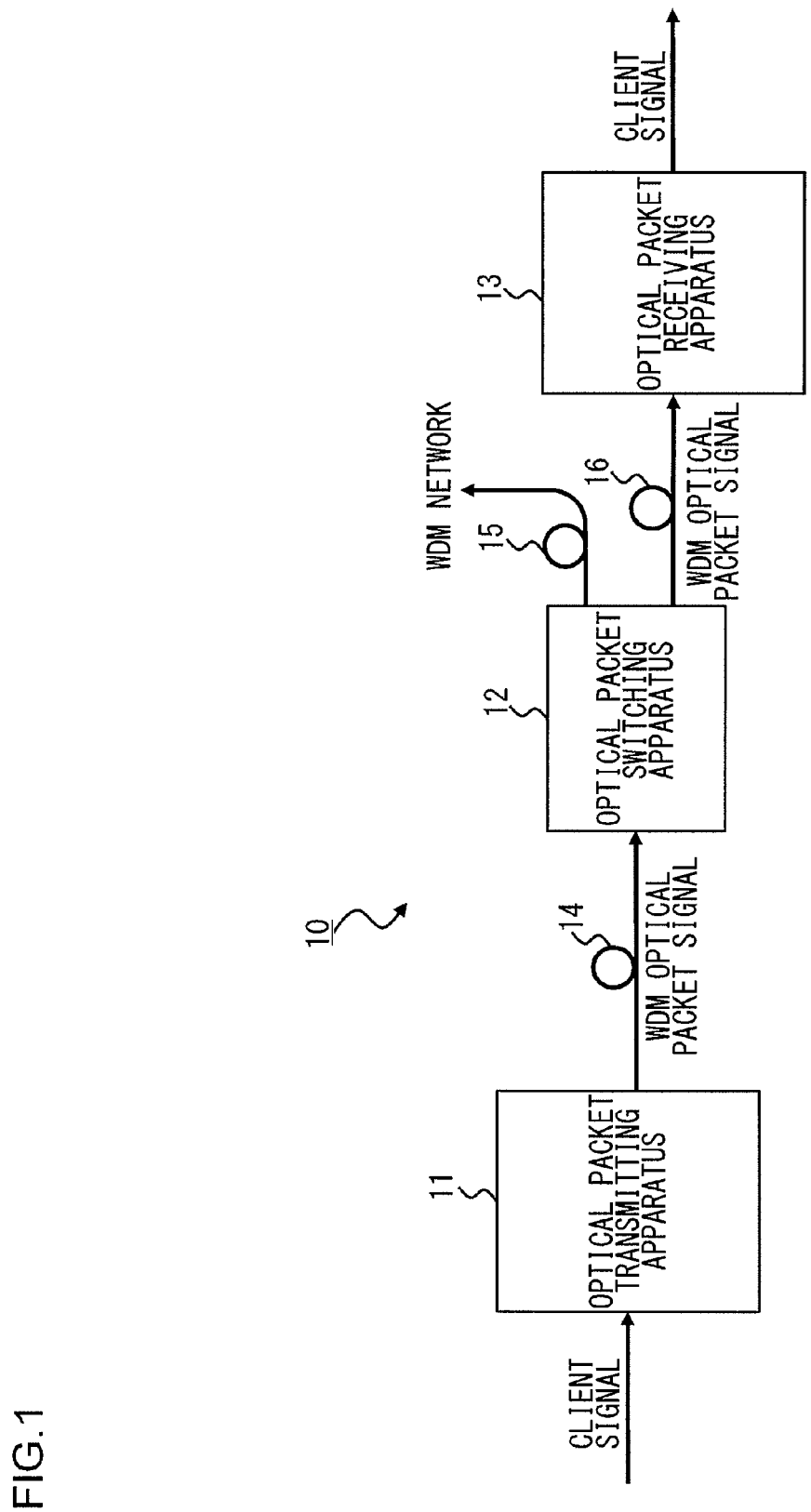
FIG. 1 illustrates an optical packet switching system according to a first embodiment of the present invention.

FIG. 1 illustrates an optical packet switching system 10 according to a first embodiment of the present invention. As shown in FIG. 1, the optical packet switching system 10 includes an optical packet transmitting apparatus 11, an optical packet switching apparatus 12 with one input and two outputs, an optical packet receiving apparatus 13, and first to third optical transmission paths 14 to 16.

The optical packet transmitting apparatus 11 splits a client signal received from a client side into ten signals. Here, the client signal is 10 GEther (10 Gigabit Ethernet (registered trademark) packet signal), for example. Then the thus split ten data are loaded on optical signals of wavelengths $\lambda 1$ to $\lambda 10$ so as to generate optical packet signals of ten wavelengths. Then the optical packet signals of wavelength $\lambda 1$ to $\lambda 10$ are wavelength-multiplexed and outputted as WDM optical packet signals. Note that although the division number of the client signal and the number of wavelengths are both ten but they may be set to an arbitrary number.

A WDM optical packet signal outputted from the optical packet transmitting apparatus 11 is inputted to the optical packet switching apparatus 12 via the first optical transmission path 14.

The optical packet switching apparatus 12 extracts routing information from the inputted WDM optical packet signal and switches the route of the WDM optical packet signal according to the routing information extracted. The second optical transmission path 15 is connected to a first output unit of the optical packet switching apparatus 12, whereas the third optical transmission path 16 is connected to a second output unit thereof. The WDM optical packet signal that has propagated through the second optical transmission path 15 is outputted to a WDM network. At the same time, the WDM optical packet signal that has propagated through the third optical transmission path 16 is inputted to the optical packet receiving apparatus 13.

The optical packet receiving apparatus 13 demultiplex the received WDM optical packet signal into optical packet signals of wavelengths $\lambda 1$ to $\lambda 10$, then restores the original client signal and outputs the restored signal to the client side.

Figure 2:
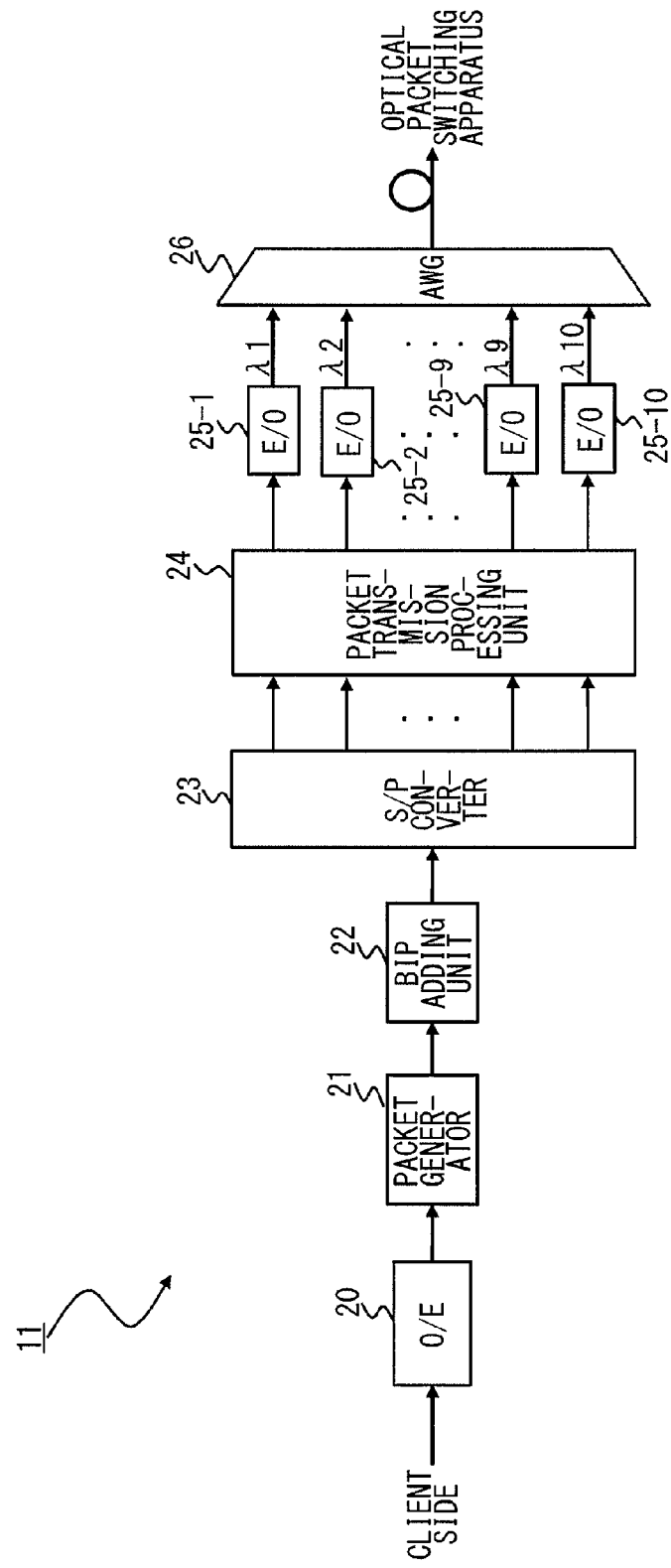
FIG. 2 illustrates an optical packet transmitting apparatus according to a first embodiment of the present embodiment.

FIG. 2 illustrates a structure of the optical packet transmitting apparatus 11 according to the first embodiment of the present embodiment. As shown in FIG. 2, the optical packet transmitting apparatus 11 includes an optical-to-electrical (O/E) converter 20, a packet generator 21, a BIP (bit interleaved parity) adding unit 22, a serial/parallel converter 23, a packet transmission processing unit 24, first to tenth electrical-to-optical (E/O) converters 25-1 to 25-10, and an AWG (arrayed waveguide grating) 26.

The electrical-to-optical converter 20 converts the client signal inputted from the client side into an electrical signal and then sends the converted signal to the packet generator 21. The packet generator 21 adds a header, which contains the routing information, and the like to the client signal so as to generate a packet signal.

Figure 3:
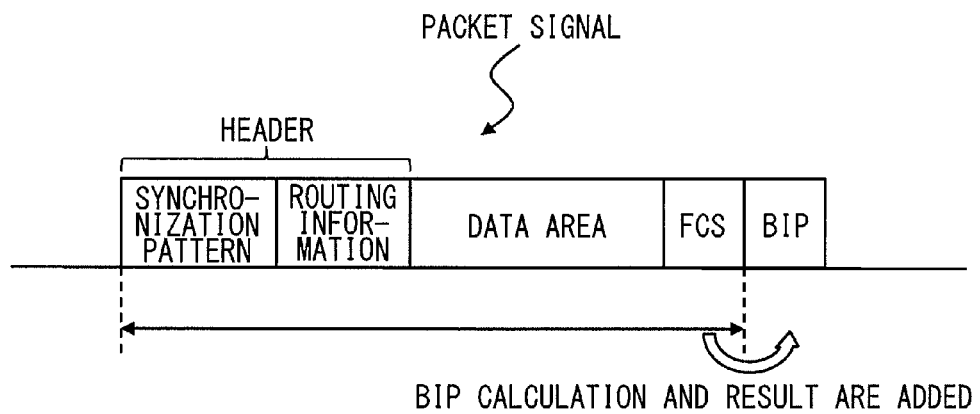
FIG. 3 is a diagram showing a data format of packet signal according to a first embodiment of the present invention.

FIG. 3 is a diagram showing a data format of packet signal according to the first embodiment of the present invention. As shown in FIG. 3, each packet signal includes a data area, which is a user area, a header provided before the data area, and a frame check sequence (FCS), for use in detecting error, provided after the header area. The header has a synchronization pattern used in frame synchronization and routing information. The header further has information on the packet length and the like. The packet signals generated by the packet generator 21 are sent to the BIP adding unit 22.

The BIP adding unit 22 computes the bit interleaved parity (BIP) of the inputted packet signal and then adds the computation result to this packet signal. As shown in FIG. 3, BIP is provided after FCS. The packet signal to which the BIP has been added is sent to the serial/parallel converter 23.

The serial/parallel converter 23 converts the inputted packet signal into ten divided packet signals. The divided packet signals outputted from the serial/parallel converter 23 are inputted to the packet transmission processing unit 24.

The packet transmission processing unit 24 converts the inputted divided packet signals into those having each a packet format compliant with a predetermined optical packet switching scheme as follows. That is, the packet transmission processing unit 24 processes the inputted divided packet signals in such a manner that a preamble is appended to the beginning of each of the divided packet signals, for example. The divided packet signals outputted from the packet transmission processing unit 24 are sent to the first to tenth electrical-to-optical converters 25-1 to 25-10.

The first to tenth electrical-to-optical converters 25-1 to 25-10 convert the inputted ten divided packet signals into optical packet signals of ten wavelengths $\lambda 1$ to $\lambda 10$, respectively, so as to be sent out. Here, an optical packet signal of wavelength $\lambda 1$ sent out from the first electrical-to-optical converter 25-1 has a header containing the routing information and the like. Thus, the wavelength $\lambda 1$ of an optical packet signal having this header will be hereinafter referred to as "header wavelength" also.

The optical packet signals of wavelengths $\lambda 1$ to $\lambda 10$ sent out from the first to tenth electrical-to-optical converters 25-1 to 25-10 are inputted to the AWG 26. The AWG 26 multiplexes the optical packet signals of wavelengths $\lambda 1$ to $\lambda 10$, thereby generates WDM optical packet signals, and sends them out to the optical packet switching apparatus 12.

Figure 4:
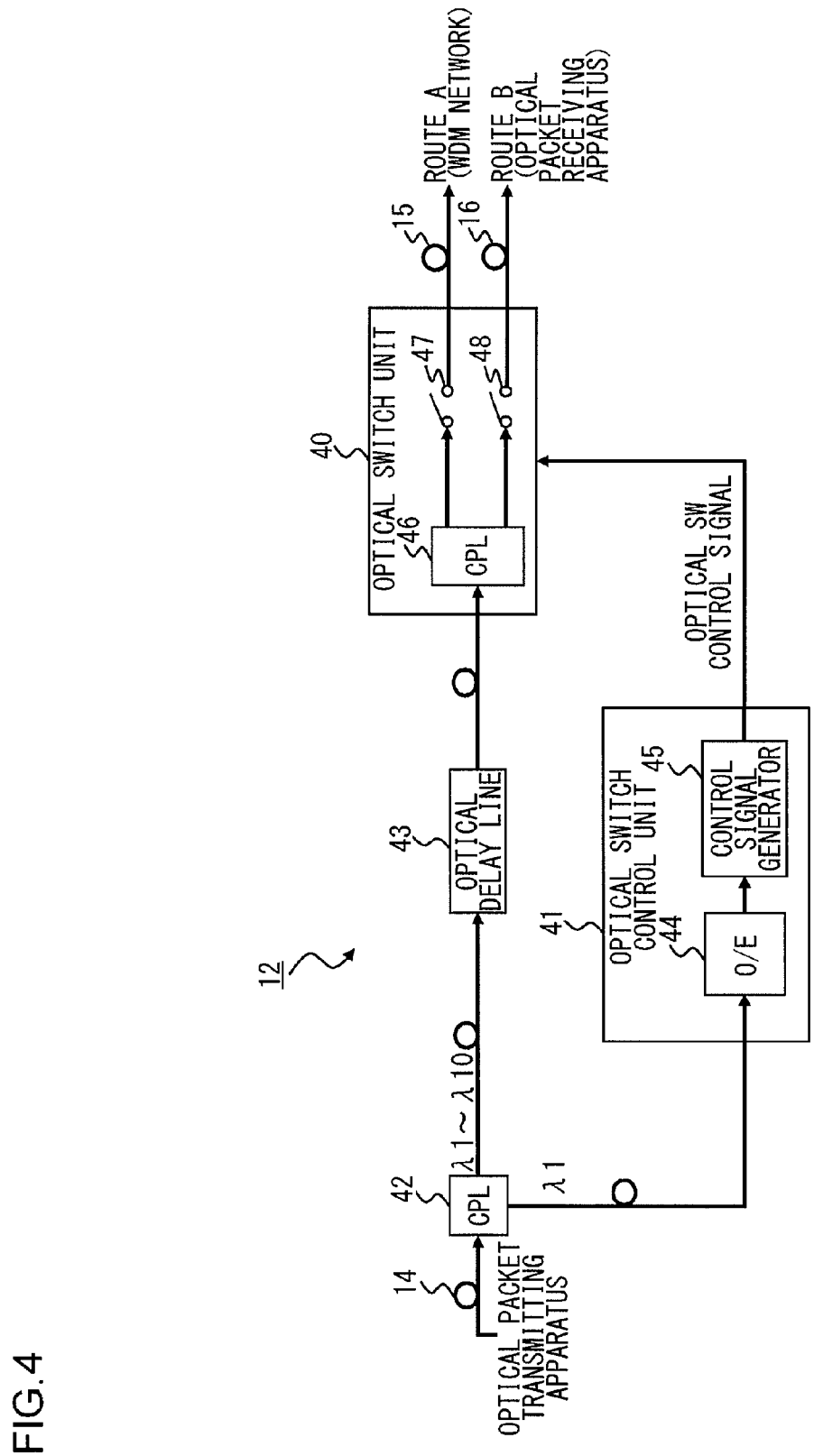
FIG. 4 illustrates a structure of an optical packet switching apparatus according to a first embodiment of the present invention.

FIG. 4 illustrates a structure of an optical packet switching apparatus 12 according to the first embodiment of the present invention. As shown in FIG. 4, the optical packet switching apparatus 12 includes an optical switch unit 40, an optical switch control unit 41, a coupler 42, and an optical delay line 43. The optical switch control unit 41 includes an optical-to-electrical (O/E) converter 44, and a control signal generator 45.

The WDM optical packet signals inputted via the first optical transmission path 14 are received by the coupler 42. The coupler 42 branches off only the optical packet signal of header wavelength λ1 from the received WDM optical packet signals. The branched-off optical packet signal of header wavelength λ1 is inputted to the optical switch control unit 41. At the same time, the WDM optical packet signals (λ1 to λ10) that have passed through the coupler 42 are inputted to the optical switch unit 40 via the optical delay line 43.

The optical packet signal of header wavelength λ1 is converted into an electrical signal by the optical-to-electrical converter 44 before the header of the electric signal is analyzed at the control signal generator 45 and thereby the routing information is detected. Then, the control signal generator 45 generates an optical switch control signal based on the detected routing information and outputs the thus generated optical switch control signal to the optical switch unit 40.

The optical delay line 43 delays the WDM optical packet signal by a time length equivalent to the time duration required for the generation of the optical switch control signal by the optical switch control unit 41. It takes a certain length of time for the control signal generator 45 to analyze the header. Thus, if the WDM optical packet signal is directly inputted from the coupler 42 to the optical switch unit 40, a delay of the optical switch control signal relative to the WDM optical packet signal will occur and therefore the route of the WDM optical packet signal cannot be preferably switched. In the light of this, the optical delay line 43 is provided between the coupler 42 and the optical switch unit 40 and thereby the WDM optical packet signal is delayed by the time length equivalent to the time duration required for the generation of the optical switch control signal, so that the route of the WDM optical packet signal can be preferably switched. The delay time can be varied by adjusting the length of optical delay line 43 (optical fiber length).

The optical switch unit 40, which is an optical switch with one input and two outputs, has an optical coupler 46, a first optical gate switch 47, and a second optical gate switch 48. The optical gate switch may be implemented as that employing a semiconductor optical amplifier (SOA). The on/off of the first optical gate switch 47 and the second optical gate switch 48 is controlled by the optical switch control signal fed from the optical switch control unit 41. The optical packet switching apparatus 12 switches the entire optical packet signals of the multiplexed ten wavelengths at once, based on the routing information extracted from the single optical packet signal of header wavelength λ1. For example, if the WDM optical packet signal is to be outputted to route A (i.e., WDM network), the first optical gate switch 47 will be turned on and the second optical gate switch 48 will be turned off. As a result, the WDM optical packet signal passes through the first optical gate switch 47 only and is outputted to the route A.

Figure 5:
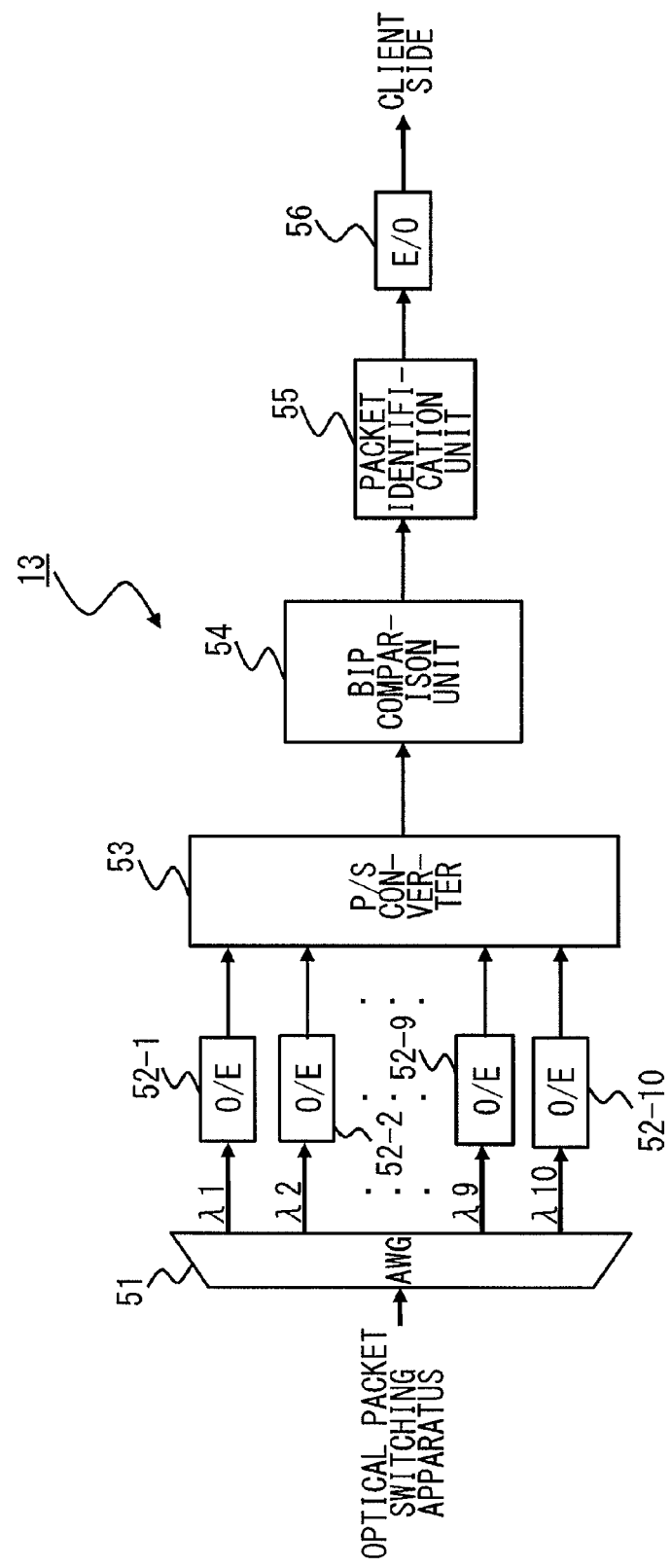
FIG. 5 illustrates a structure of an optical packet receiving apparatus according to a first embodiment of the present invention.

FIG. 5 illustrates a structure of the optical packet receiving apparatus 13 according to the first embodiment of the present invention. As shown in FIG. 5, the optical packet receiving apparatus 13 includes an AWG 51, first to tenth optical-to-electrical (O/E) converters 52-1 to 52-10, a parallel/serial converter 53, a BIP comparison unit 54, a packet identification unit 55, an electrical-to-optical (E/O) converter 56.

The AWG 51 demultiplex the WDM optical packet signal, received from the optical packet switching apparatus, into optical packets of wavelengths λ1 to λ10.

The first to tenth optical-to-electrical converters 52-1 to 52-10 convert the optical packet signals of ten wavelengths, demultiplexed by the AWG 51, into electrical divided packet signals, respectively.

The parallel/serial converter 53 parallel-to-serial converts the ten divided packet signals so as to generate a serial packet signal. Also, the parallel/serial converter 53 determines the normality of the packet signal by the use of FCS. For example, if abnormality such as a case where a part of the divided packets is missing is detected, the parallel/serial converter 53 will discard the packet signal. The packet signal outputted from the parallel/serial converter 53 is inputted to the BIP comparison unit 54.

The BIP comparison unit 54 computes BIP of an inputted packet signal. Then the BIP comparison unit 54 compares a computation result of BIP against the BIP attached to the inputted packet signal and thereby detects the number of bit errors. Since the packet length is obtained from the header, a bit error rate can be calculated if the number of bit errors is obtained. The formula for computation of the bit error rate is as follows.

[Bit error rate]=[The number of bit errors]/[the frame length (bytes)×8 bits].

The packet signal outputted from the BIP comparison unit 54 is inputted to the packet identification unit 55.

The packet identification unit 55 identifies a client signal from the inputted packet signal and retrieves the client signal. Then the client signal is converted into an optical signal by the electrical-to-optical converter 56 and outputted to the client side.

As described above, by employing the optical packet switching system 10 according to the first embodiment, the BIP adding unit 22 is provided in the optical packet transmitting apparatus 11, and the BIP comparison unit 54 is provided in the optical packet receiving apparatus 13. Hence, the bit error rate of optical packet signals that have propagated through the optical transmission path can be detected and thereby the signal quality of the optical transmission path can be monitored.

Also, in the optical packet transmitting apparatus 11 according to the first embodiment, the BIP adding unit 22 is provided before the serial/parallel converter 23. Also, in the optical packet receiving apparatus 13 according to the first embodiment, the BIP comparison unit 54 is provided subsequent to the parallel/serial converter 53. Thus, the serial packet signal undergoes BIP computation and BIP comparison. Hence, a single BIP adding unit 22 and a single BIP comparison unit 54 suffice, thereby reducing the circuit scale.

(Second Embodiment)

A description is now given of an optical packet switching system according to a second embodiment of the present invention.

Figure 6:
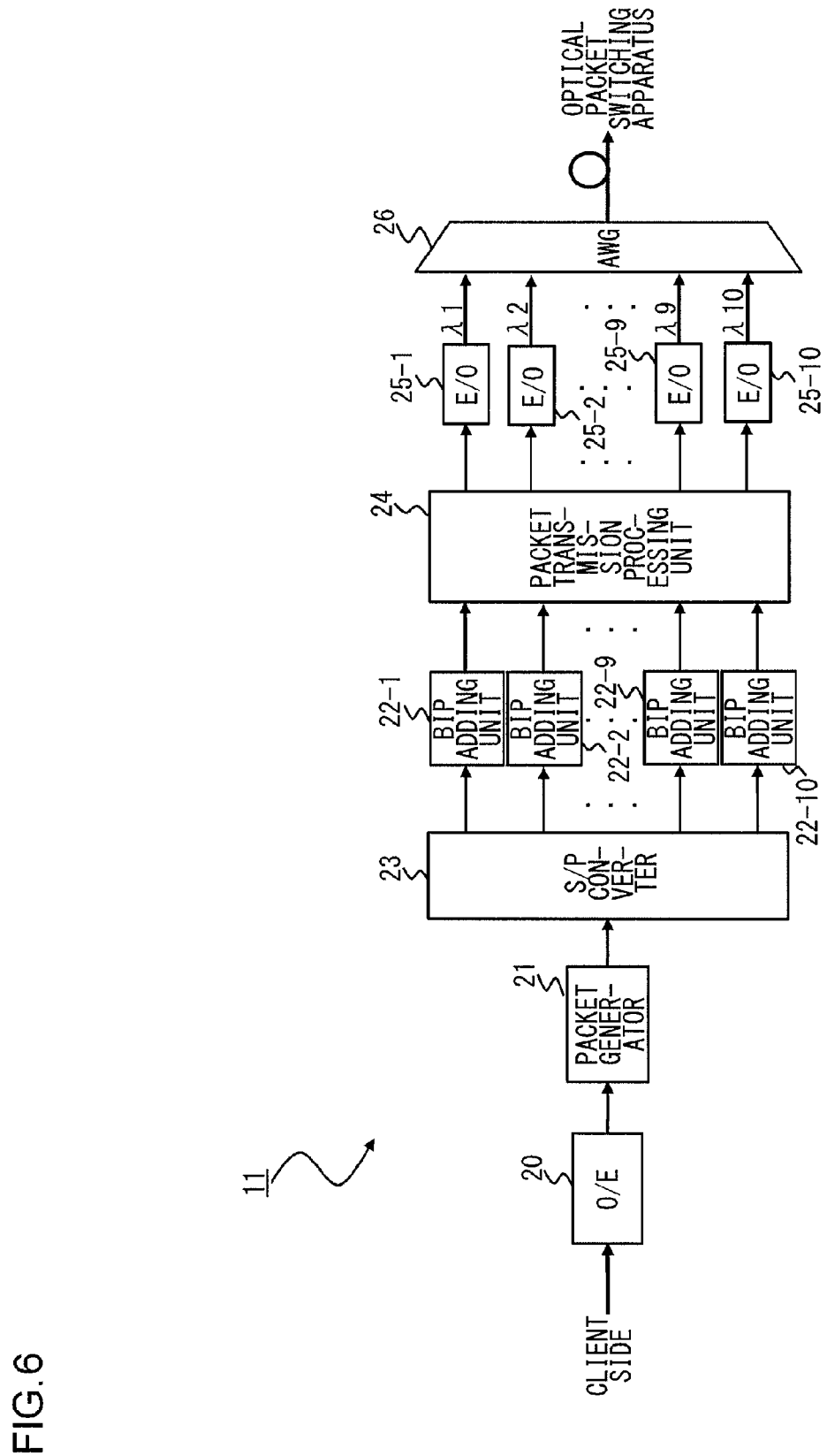
FIG. 6 illustrates a structure of an optical packet transmitting apparatus according to a second embodiment of the present invention.

FIG. 6 illustrates a structure of an optical packet transmitting apparatus 11 according to a second embodiment of the present invention. Components of the optical packet switching system according to the present embodiment which are identical to or correspond to those of the optical packet switching system shown in FIG. 1 to FIG. 5 are given the same reference numerals herein and the repeated description thereof are omitted as appropriate.

The optical packet transmitting apparatus 11 according to the present embodiment differs from that according to the first embodiment of FIG. 2 in that ten BIP adding units (first to tenth BIP adding units 22-1 to 22-10) are provided subsequent to the serial/parallel converters 23.

In the present embodiment, the BIP adding units 22-1 to 22-10 each computes the bit interleaved parity (BIP) of each of the divided packet signals outputted from the serial/parallel converter 23 and then each adds the computation result to each of the divided packet signals. Preambles are appended respectively to the ten divided packet signals to which the BIPs have been added. Then the ten divided packet signals are converted into optical packet signals of wavelengths λ1 to λ10 by the first to tenth electrical-to-optical converters 25-1 to 25-10, respectively.

Figure 7:
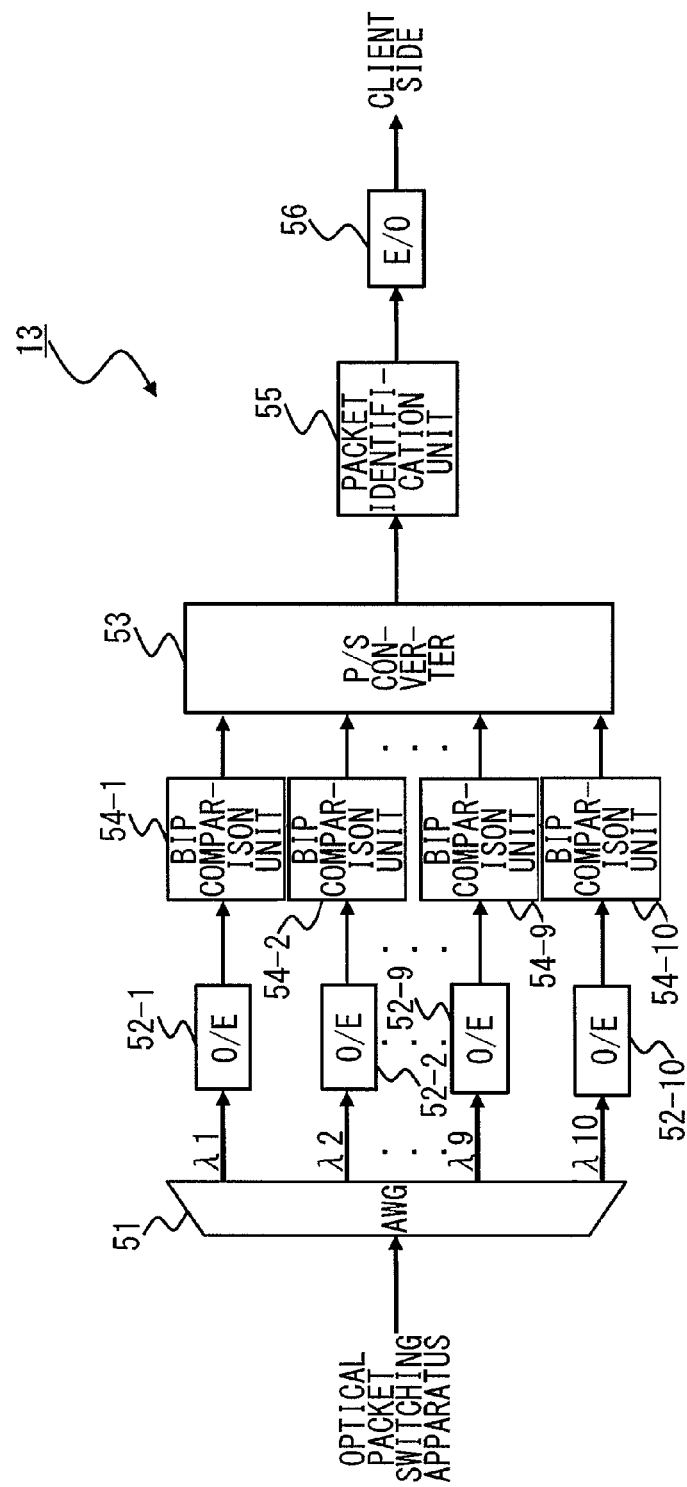
FIG. 7 illustrates a structure of an optical packet receiving apparatus according to a second embodiment of the present invention.

FIG. 7 illustrates a structure of an optical packet receiving apparatus 13 according to the second embodiment of the present invention. The optical packet receiving apparatus 13 according to the present embodiment differs from that according to the first embodiment of FIG. 5 in that ten BIP comparison units (first to tenth BIP comparison units 54-1 to 54-10) are provided before the parallel/serial converter 53.

In the present embodiment, the optical packet signals of wavelengths λ1 to λ10 demultiplexed by the AWG 51 are converted into electrical divided packet signals by the first to tenth optical-to-electrical converters 52-1 to 52-10. Each of the first to tenth BIP comparison units 54-1 to 54-10 compares the added BIP with the computed BIP about each of the divided packet signals fed from the first to tenth optical-to-electrical converters 54-1 to 54-10, thereby detecting the bit rate of the packet signal. The ten divided packet signals outputted from the first to tenth optical-to-electrical converters 52-1 to 52-10 are converted into a serial packet signal by the parallel/serial converter 53 and then are outputted to the client side via the packet identification unit 55 and the electrical-to-optical converter 56.

As described above, by employing the optical packet switching system according to the second embodiment, the bit error rate of each of the optical packet signals of wavelengths λ1 to λ10 can be detected, so that the signal quality of the optical transmission path can be monitored in more detail.

(Third embodiment)

A description is now given of an optical packet switching system according to a third embodiment of the present invention.

Figure 8:
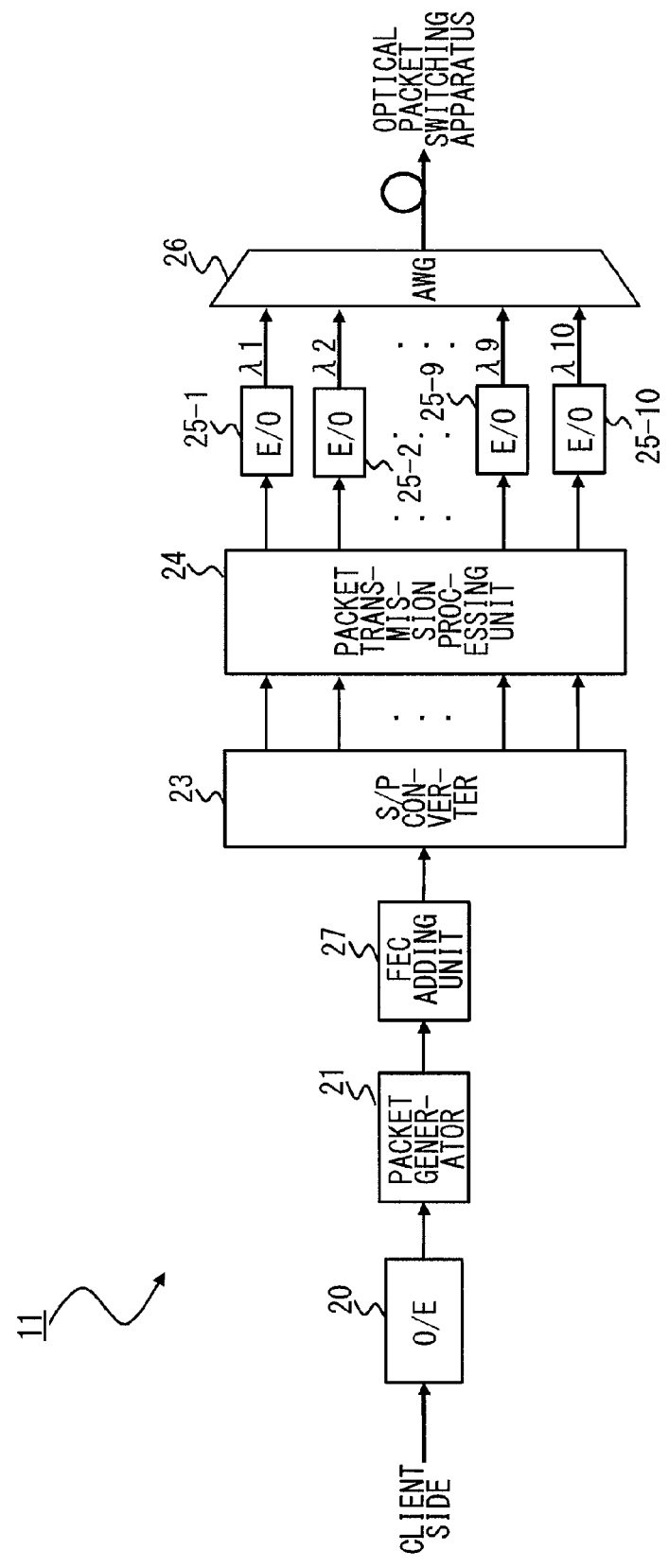
FIG. 8 illustrates a structure of an optical packet transmitting apparatus according to a third embodiment of the present invention.

FIG. 8 illustrates a structure of an optical packet transmitting apparatus 11 according to the third embodiment of the present invention. The optical packet transmitting apparatus 11 according to the present embodiment differs from that according to the first embodiment of FIG. 2 in that an FEC (forward error correction) adding unit 27 is provided in substitution for the BIP adding unit.

Figure 9:
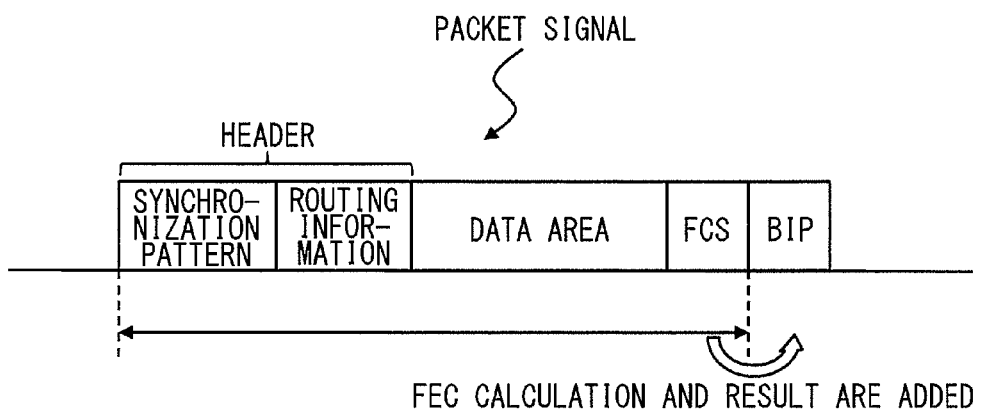
FIG. 9 is a diagram showing a data format of packet signal according to a third embodiment of the present invention.

The FEC adding unit 27 computes an FEC code of a packet signal inputted from the packet generator 21 and adds the computation result to this packet signal. FIG. 9 is a diagram showing a data format of packet signal according to the third embodiment of the present invention. As shown in FIG. 9, each packet signal includes a data area, a header provided before the data area, and a frame check sequence (FCS) provided after the data area. As shown in FIG. 9, the FEC code is provided after the FCS. The packet signal to which the FEC code has been added is sent to the serial/parallel converter 23. The processing after this is the same as that of the optical packet transmitting apparatus of the first embodiment, so that the description thereof is omitted here.

Figure 10:
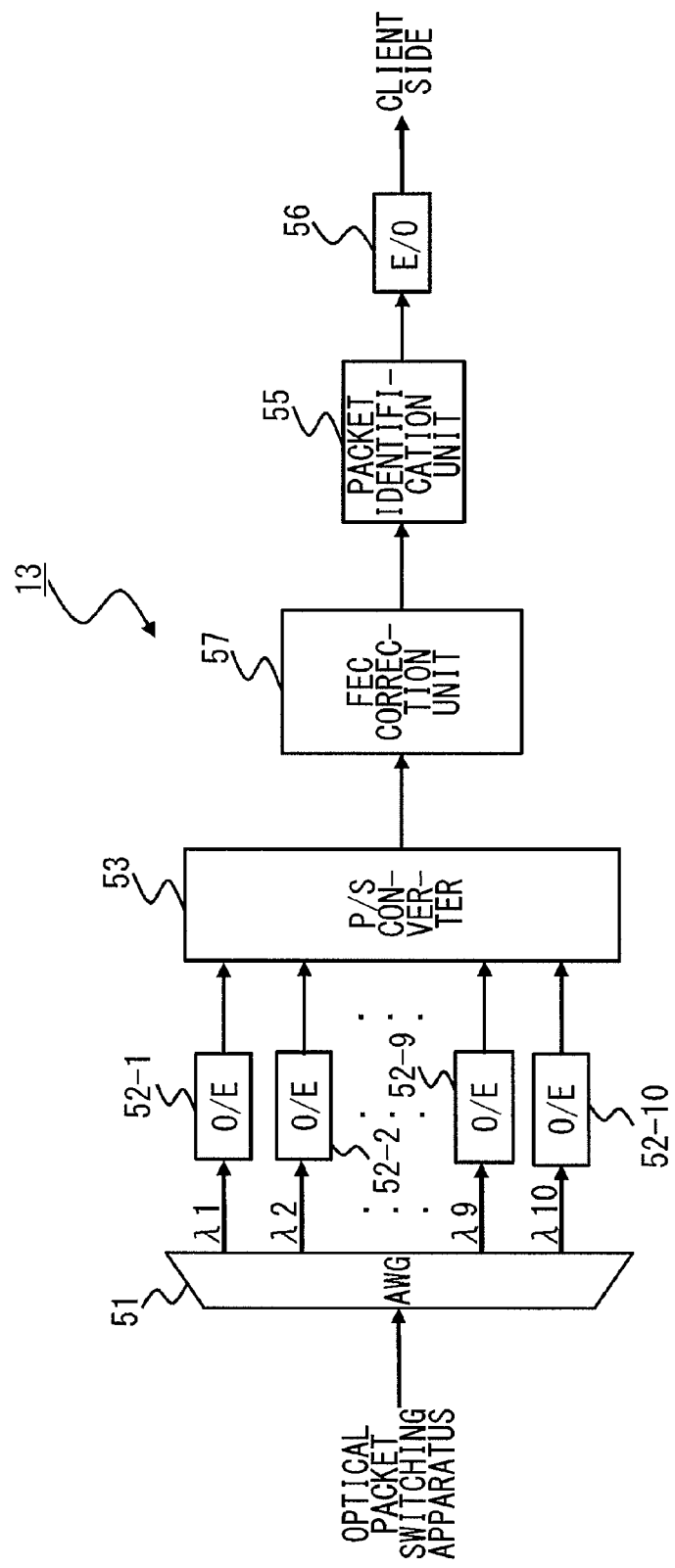
FIG. 10 illustrates a structure of an optical packet receiving apparatus according to a third embodiment of the present invention.

FIG. 10 illustrates a structure of an optical packet receiving apparatus 13 according to the third embodiment of the present invention. The optical packet receiving apparatus 13 according to the present embodiment differs from that according to the first embodiment of FIG. 5 in that an FEC correction unit 57 is provided in substitution for the BIP comparison unit.

The FEC correction unit 57 detects the bit error rate of the packet signal, based on the FEC code added to the packet signal inputted from the parallel/serial converter 53, and corrects the bit error of the packet signal. The packet signal whose bit error has been corrected is inputted to the packet identification unit 55. The processing after this is the same as that of the optical packet transmitting apparatus of the first embodiment, so that the description thereof is omitted here.

As described above, by employing the optical packet switching system according to the third embodiment, the FEC adding unit 27 is provided in the optical packet transmitting apparatus 11, and the FEC correction unit 57 is provided in the optical packet receiving apparatus 13. Hence, the bit error rate of optical packet signals that have propagated through the optical transmission path can be detected and, at the same time, the bit error of the packet signal can be corrected.

Also, in the optical packet transmitting apparatus 11 according to the third embodiment, the FEC adding unit 27 is provided before the serial/parallel converter 23. Also, in the optical packet receiving apparatus 13 according to the third embodiment, the FEC correction unit 57 is provided subsequent to the parallel/serial converter 53. Thus, the serial packet signal undergoes FEC computation and FEC correction. Hence, a single FEC adding unit 27 and a single FEC correction unit 57 suffice, thereby reducing the circuit scale.

(Fourth Embodiment)

A description is now given of an optical packet switching system according to a fourth embodiment of the present invention.

Figure 11:
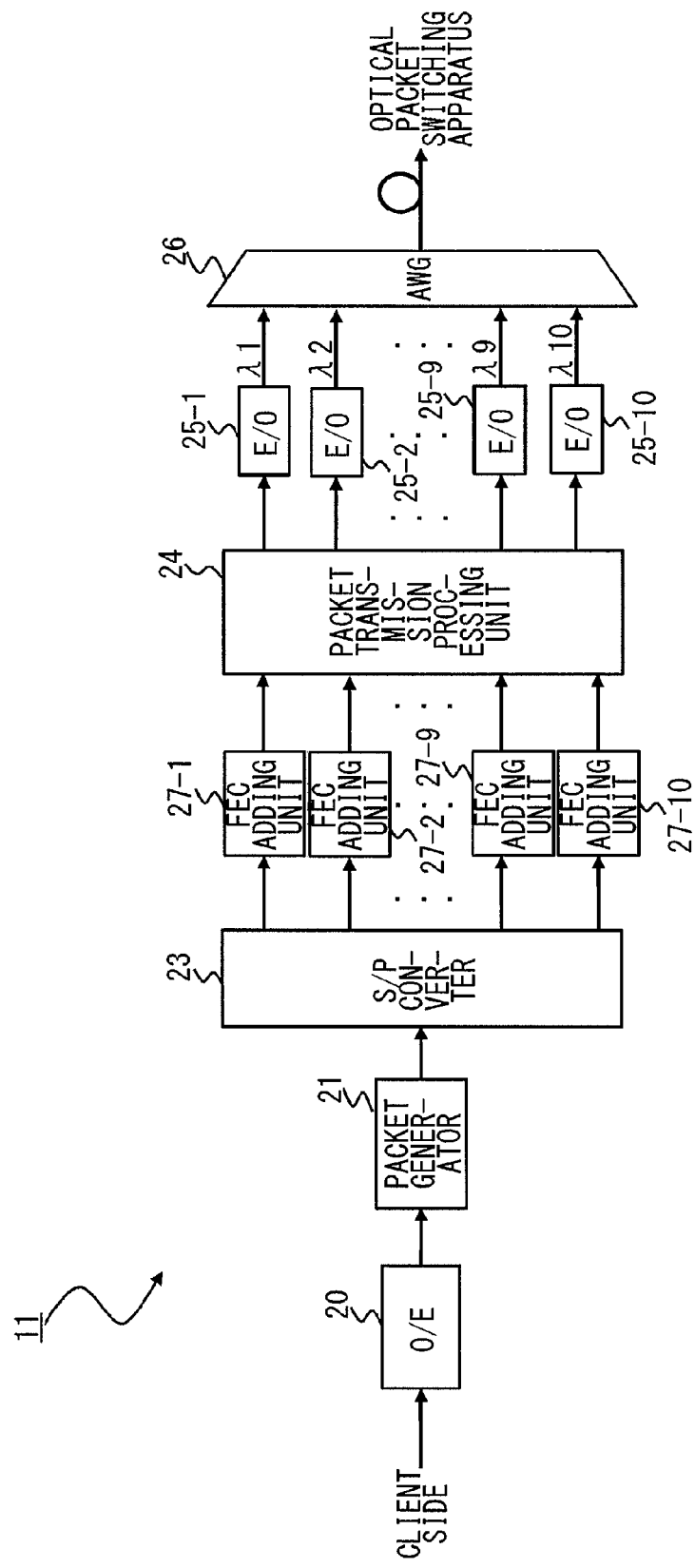
FIG. 11 illustrates a structure of an optical packet transmitting apparatus according to a fourth embodiment of the present invention.

FIG. 11 illustrates a structure of an optical packet transmitting apparatus 11 according to the fourth embodiment of the present invention. The optical packet transmitting apparatus 11 according to the present embodiment differs from that according to the second embodiment of FIG. 6 in that first to tenth FEC adding units are provided in substitution for the first to tenth BIP adding units.

The first to tenth FEC adding units 27-1 to 27-10 each computes the FEC code of each of the divided packet signals outputted from the serial/parallel converter 23 and each adds the computation result to each of the divided packet signals. The packet transmission processing unit 24 appends preambles to the ten divided packet signals, to which the FEC codes have been added, respectively. Then the ten divided packet signals are converted into optical packet signals of wavelengths λ1 to λ10 by the first to tenth electrical-to-optical converters 25-1 to 25-10, respectively.

Figure 12:
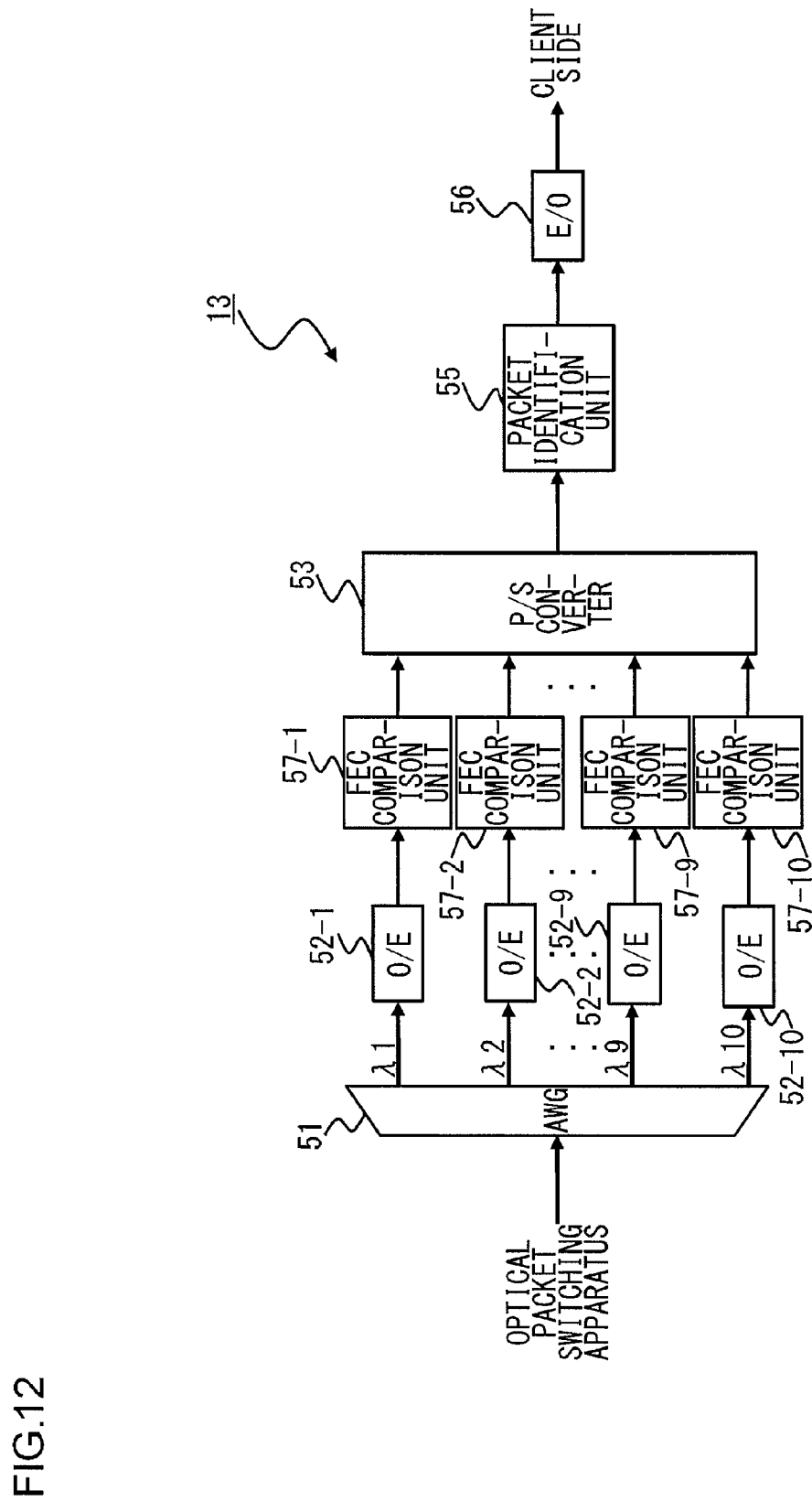
FIG. 12 illustrates a structure of an optical packet receiving apparatus according to a fourth embodiment of the present invention.

FIG. 12 illustrates a structure of an optical packet receiving apparatus 13 according to the fourth embodiment of the present invention. The optical packet receiving apparatus 13 according to the present embodiment differs from that according to the second embodiment in that first to tenth FEC correction units 57-1 to 57-10 are provided in substitution for the first to tenth BIP comparison units 54-1 to 54-10.

In the present embodiment, the optical packet signals of wavelengths λ1 to λ10 demultiplexed by the AWG 51 are converted into electrical divided packet signals by the first to tenth optical-to-electrical converters 52-1 to 52-10. The first to tenth FEC correction units 57-1 to 56-10 each detects the bit error of each of the divided packet signals, based on the FEC codes added to the divided packet signals fed from the first to tenth optical-to-electrical converters 52-1 to 57-10, and each corrects the bit error of each of the divided packet signals. The ten divided packet signals whose bit errors have been corrected are converted into a serial packet signal by the parallel/serial converter 53 so as to be outputted to the client side via the packet identification unit 55 and the electrical-to-optical converter 56.

As described above, by employing the optical packet switching system according to the fourth embodiment, not only the bit error rate of each of the optical packet signals of wavelengths λ1 to λ10 can be detected but also the bit error thereof can be corrected.

(Fifth Embodiment)

A description is now given of an optical packet switching system according to a fifth embodiment of the present invention.

Figure 13:
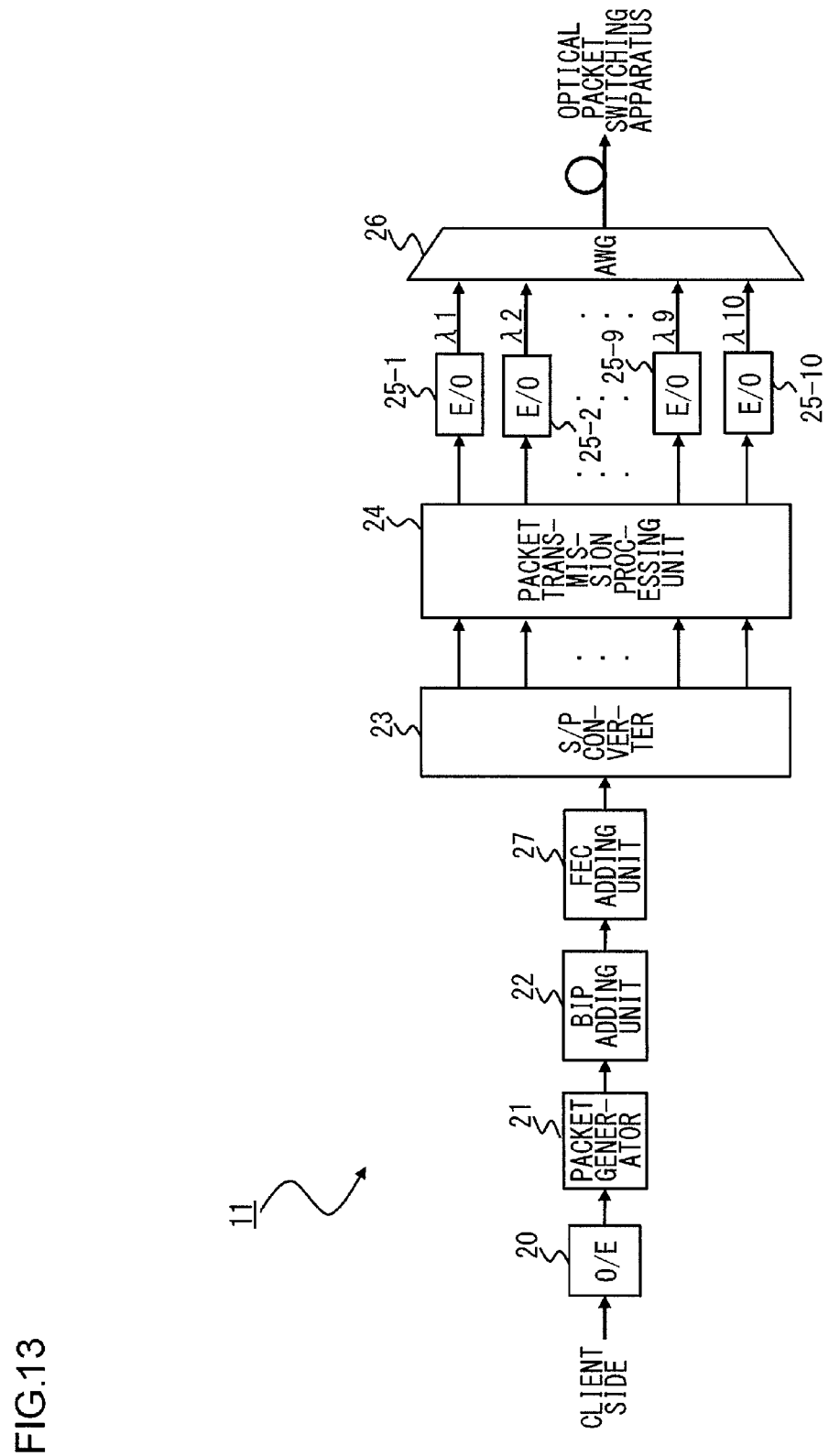
FIG. 13 illustrates a structure of an optical packet transmitting apparatus according to a fifth embodiment of the present invention.

FIG. 13 illustrates a structure of an optical packet transmitting apparatus 11 according to the fifth embodiment of the present invention. The optical packet transmitting apparatus 11 according to the present embodiment differs from that according to the first embodiment of FIG. 2 in that the FEC adding unit 27 is provided subsequent to the BIP adding unit 22. In other words, in the fifth embodiment, the BIP adding unit 22 and the FEC adding unit 27 are provided in series with each other.

Figure 14:
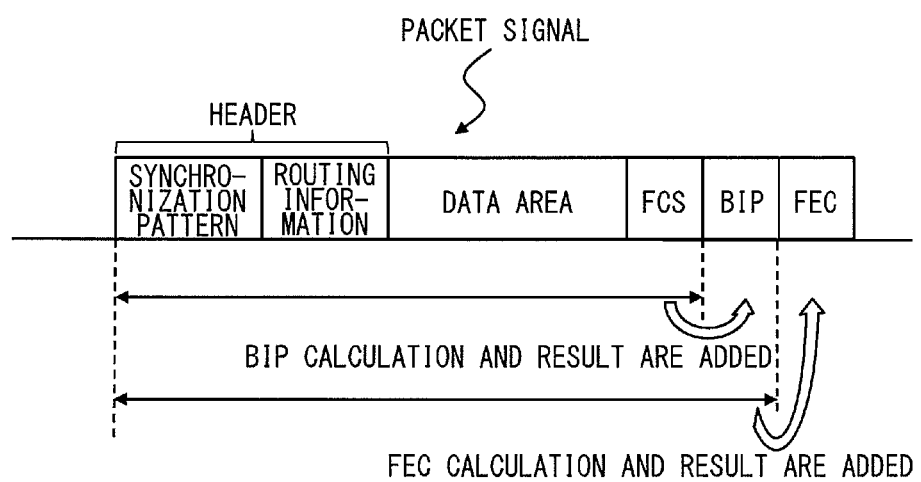
FIG. 14 is a diagram showing a data format of packet signal according to a fifth embodiment of the present invention.

FIG. 14 is a diagram showing a data format of packet signal according to the fifth embodiment of the present invention. As shown in FIG. 14, each packet signal includes a data area, a header provided before the data area, and a frame check sequence (FCS) provided after the data area. BIP is added, by the BIP adding unit 22, after the FCS. An FEC code is provided, by the FEC adding unit 27, after the BIP.

Figure 15:
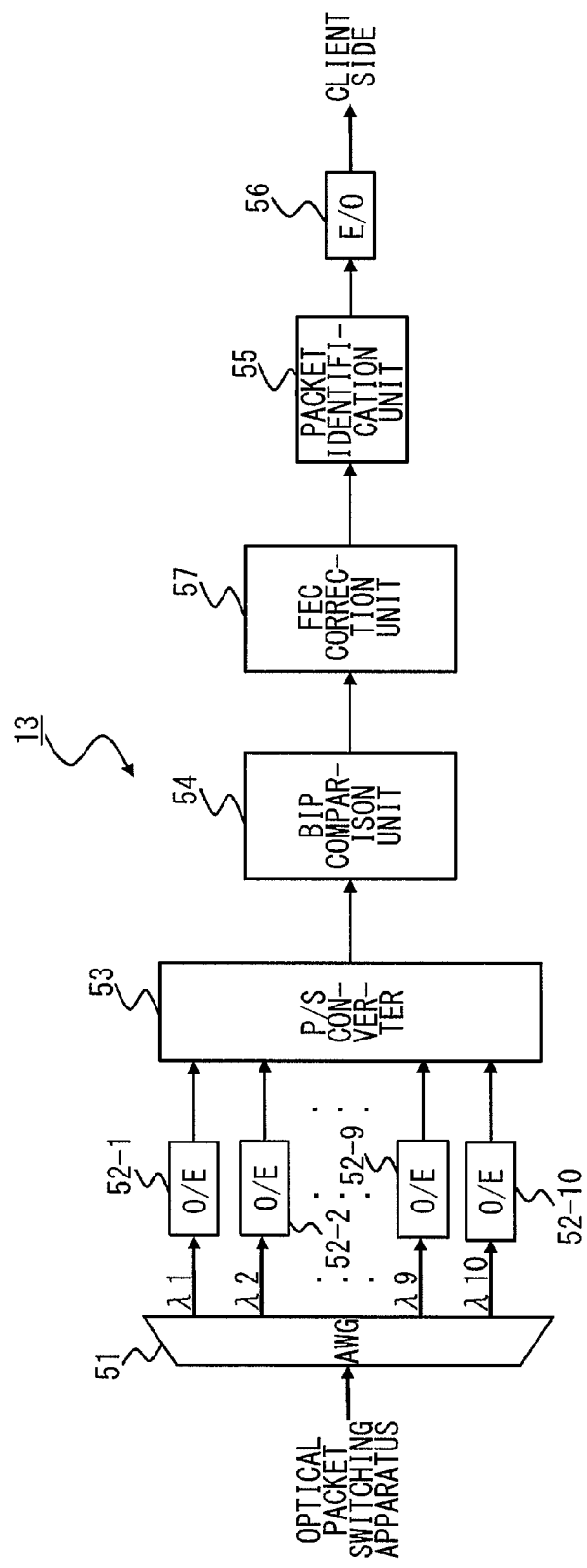
FIG. 15 illustrates a structure of an optical packet receiving apparatus according to a fifth embodiment of the present invention.

FIG. 15 illustrates a structure of an optical packet receiving apparatus 13 according to the fifth embodiment of the present invention. The optical packet receiving apparatus 13 according to the present embodiment differs from that according to the first embodiment of FIG. 5 in that the FEC correction unit 57 is provided subsequent to the BIP comparison unit 54. In other words, in the fifth embodiment, the BIP comparison unit 54 and the FEC correction unit 57 are provided in series with each other.

By employing the optical packet switching system according to the fifth embodiment, the BIP adding unit 22 and the FEC adding unit 27 are provided in the optical packet transmitting apparatus 11, and the BIP comparison unit 54 and the FEC correction unit 57 are provided in the optical packet receiving apparatus 13. Hence, the bit error rate of optical packet signals that have propagated through the optical transmission path can be detected and thereby the signal quality of the optical transmission path can be monitored. Also, the bit error of the packet signals can be corrected by the FEC adding unit 27 and the FEC correction unit 57.

Although, in the above-described optical packet transmitting apparatus 11 according to the fifth embodiment, the FEC adding unit 27 is provided subsequent to the BIP adding unit 22, the BIP adding unit 22 may be provided subsequent to the FEC adding unit 27, instead. Also, although, in the above-described optical packet receiving apparatus 13 according to the fifth embodiment, the FEC correction unit 57 is provided subsequent to the BIP comparison unit 54, the BIP comparison unit 54 may be provided subsequent to the FEC correction unit 57, instead.

(Sixth Embodiment)

A description is now given of an optical packet switching system according to a sixth embodiment of the present invention.

Figure 16:
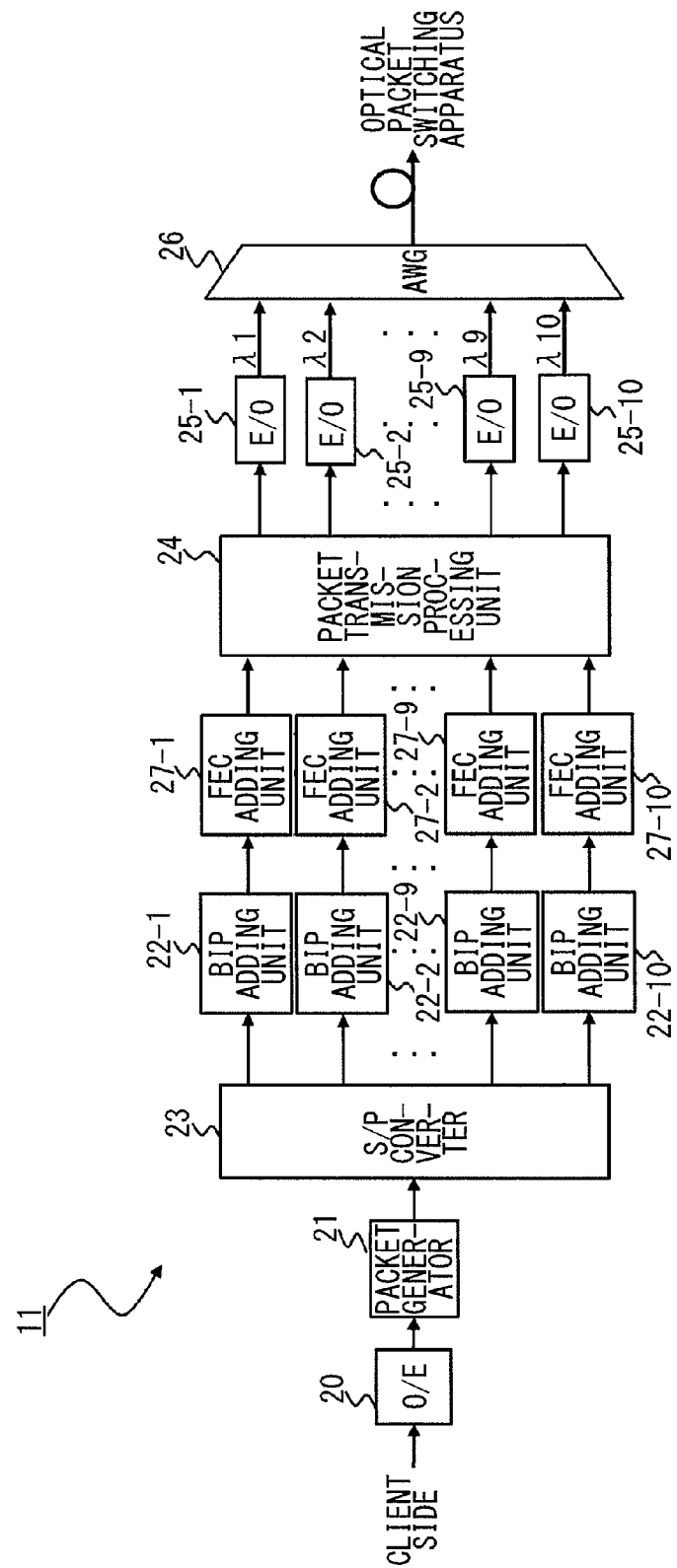
FIG. 16 illustrates a structure of an optical packet transmitting apparatus according to a sixth embodiment of the present invention.

FIG. 16 illustrates a structure of an optical packet transmitting apparatus 11 according to a sixth embodiment of the present invention. The optical packet transmitting apparatus 11 according to the present embodiment differs from that according to the second embodiment of FIG. 6 in that the first to tenth FEC adding units 27-1 to 27-10 are provided subsequent to the first to tenth BIP adding units 22-1 to 22-10. In other words, in the sixth embodiment, each of the BIP adding units 22-1 to 22-10 and each of the FEC adding units 27-1 to 27-10 are provided in series with each other.

In the present embodiment, each of the first to tenth BIP adding units 22-1 to 22-10 adds BIP to each of the divided packet signals outputted from the serial/parallel converter 23, and then each of the first to tenth FEC adding units 27-1 to 27-10 adds an FEC code thereto.

Figure 17:
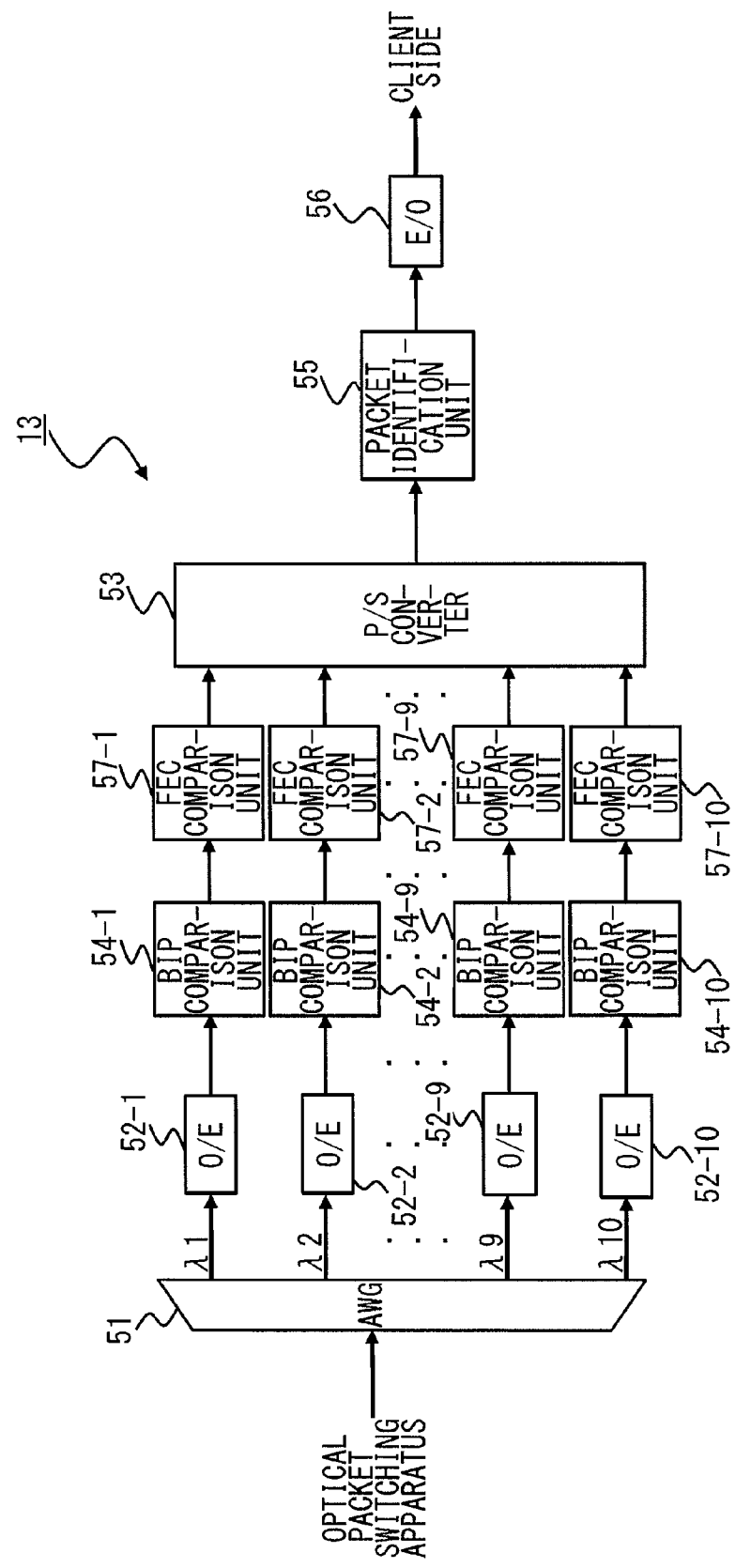
FIG. 17 illustrates a structure of an optical packet receiving apparatus according to a sixth embodiment of the present invention.

FIG. 17 illustrates a structure of an optical packet receiving apparatus 13 according to the sixth embodiment of the present invention. The optical packet receiving apparatus 13 according to the present embodiment differs from that according to the second embodiment of FIG. 7 in that the first to tenth FEC correction units 57-1 to 57-10 are provided subsequent to the first to tenth BIP comparison units 54-1 to 54-10. In other words, in the sixth embodiment, each of the BIP comparison units 54-1 to 54-10 and each of the FEC correction units 57-1 to 57-10 are provided in series with each other.

By employing the optical packet switching system according to the sixth embodiment, the first to tenth BIP adding units 22-1 to 22-10 and the first to tenth FEC adding units 27-1 to 27-10 are provided in the optical packet transmitting apparatus 11, and the first to tenth BIP comparison units 54-1 to 54-10 and the first to tenth FEC correction units 57-1 to 57-10 are provided in the optical packet receiving apparatus 13. Hence, the bit error rate of each of the optical packet signals of wavelengths λ1 to λ10 can be detected. Since the bit error for each wavelength is detected, the signal quality of the optical transmission path can be monitored in more detail. Also, the bit errors of the packet signals can be corrected by the first to tenth FEC adding units 27-1 to 27-10 and the first to tenth FEC correction units 57-1 to 57-10.

Although, in the above-described optical packet transmitting apparatus 11 according to the sixth embodiment, the FEC adding units 27-1 to 27-10 are provided subsequent to the first to tenth BIP adding units 22-1 to 22-10, respectively, the first to tenth BIP adding units 22-1 to 22-10 may be provided subsequent to the first to tenth FEC adding units 27-1 to 27-10, respectively, instead. Also, although, in the above-described optical packet receiving apparatus 13 according to the sixth embodiment, the first to tenth FEC correction units 57-1 to 57-10 are provided subsequent to the first to tenth BIP comparison units 54-1 to 54-10, the first to tenth BIP comparison units 54-1 to 54-10 may be provided subsequent to the first to tenth FEC correction units 57-1 to 57-10, respectively, instead.

(Seventh Embodiment)

A description is now given of an optical packet switching system according to a seventh embodiment of the present invention.

Figure 18:
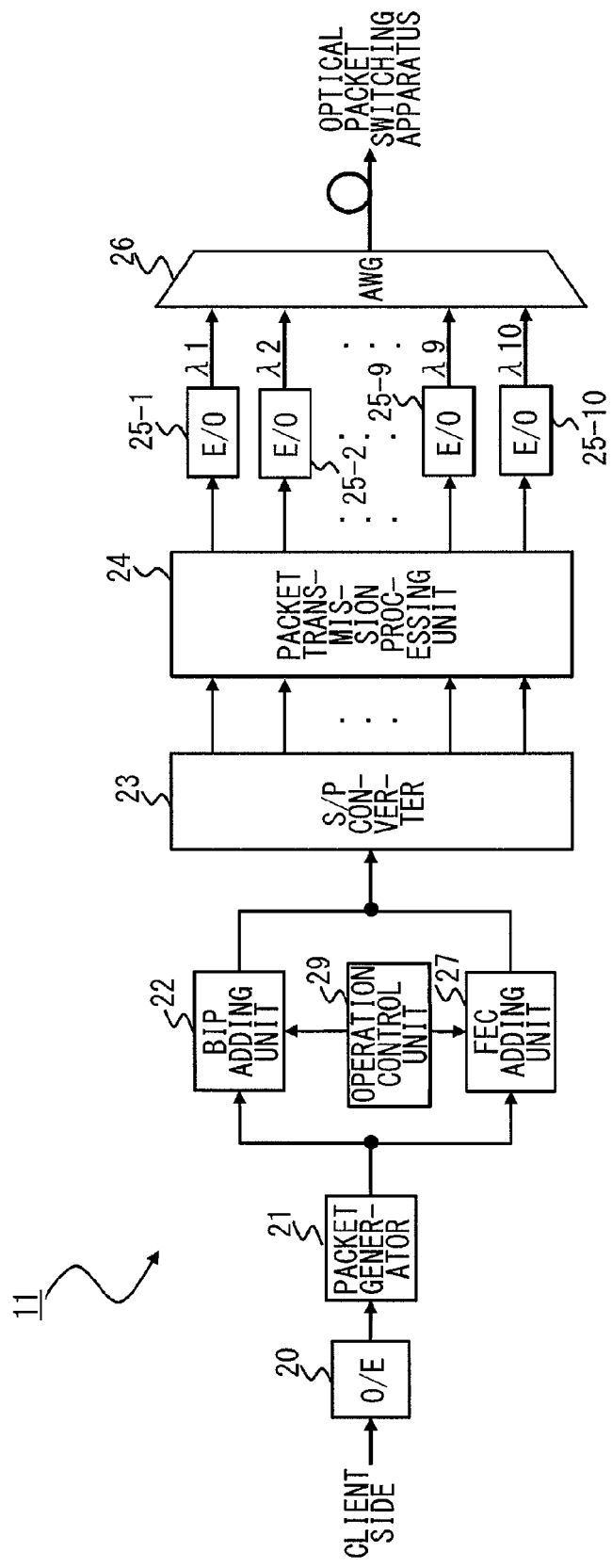
FIG. 18 illustrates a structure of an optical packet transmitting apparatus according to a seventh embodiment of the present invention.

FIG. 18 illustrates a structure of an optical packet transmitting apparatus 11 according to the seventh embodiment of the present invention. In the optical packet transmitting apparatus 11 according to the present embodiment, the BIP adding unit 22 and the FEC adding unit 27, which are provided subsequent to the packet generator 21, are provided in parallel with each other. Also provided subsequent to the packet generator 21 is an operation control unit 29 for activating either one of the BIP adding unit 22 and the FEC adding unit 27.

In the optical packet transmitting apparatus 11 according to the present embodiment, a packet signal outputted from the packet generator 21 is inputted to both the BIP adding unit 22 and the FEC adding unit 27. If the operation control unit 29 instructs the BIP adding unit 22 to operate, the BIP adding unit 22 will add BIP to the packet signal and output the BIP-added packet signal to the serial/parallel converter 23. If, on the other hand, the operation control unit 29 instructs the FEC adding unit 27 to operate, the FEC adding unit 27 will add an FEC code to the packet signal and output the FEC-code-added packet signal to the serial/parallel converter 23.

Figure 19:
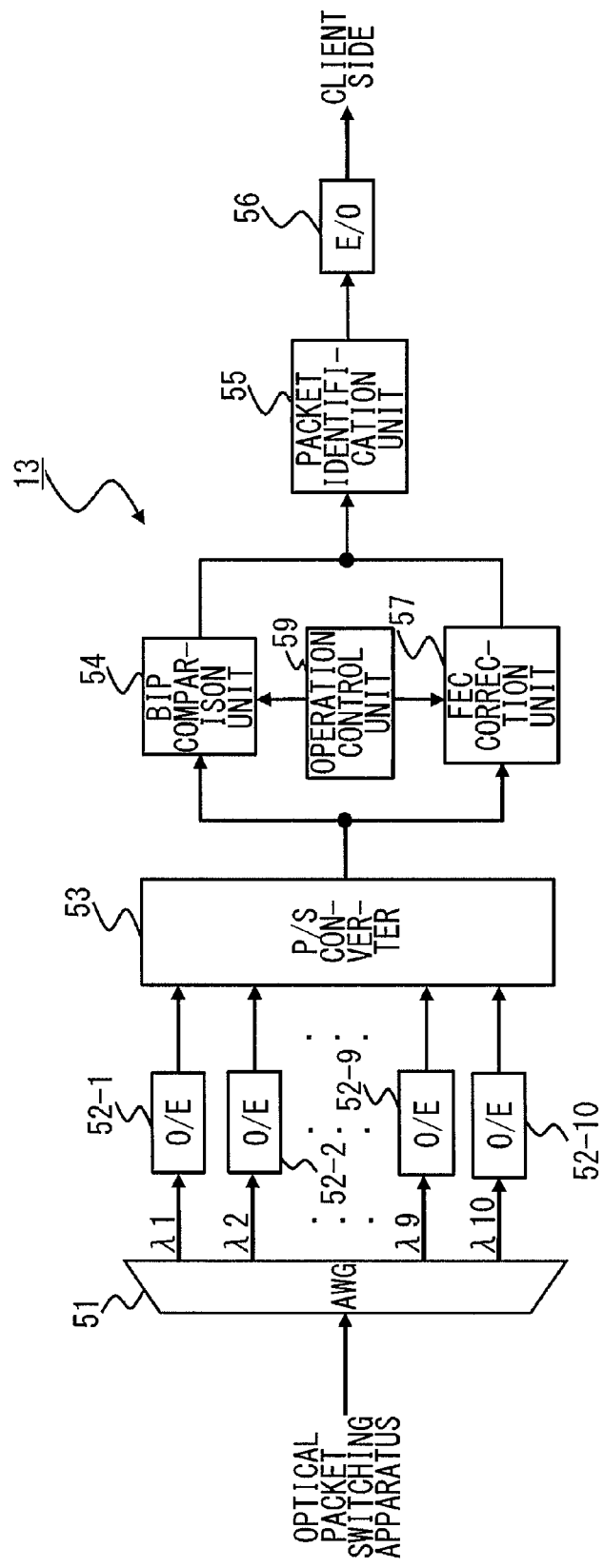
FIG. 19 illustrates a structure of an optical packet receiving apparatus according to a seventh embodiment of the present invention.

FIG. 19 illustrates a structure of an optical packet receiving apparatus 13 according to the seventh embodiment of the present invention. In the optical packet receiving apparatus 13 according to the present embodiment, the BIP comparison unit 54 and the FEC correction unit 57, which are provided subsequent to the parallel/serial converter 53, are provided in parallel with each other. Also provided subsequent to the parallel/serial converter 53 is an operation control unit 59 for activating either one of the BIP comparison unit 54 and the FEC correction unit 57.

In the optical packet receiving apparatus 13 according to the present embodiment, the packet signal outputted from the parallel/serial converter 53 is inputted to both the BIP comparison unit 54 and the FEC correction unit 57. If the operation control unit 59 instructs the BIP comparison unit 54 to operate, the BIP comparison unit 54 will detect the bit error rate of the packet signal based on the BIP. If, on the other hand, the operation control unit 59 instructs the FEC correction unit 57 to operate, the FEC correction unit 57 will detect the bit error rate of the packet signal based on the FEC code and correct the bit error of the packet signa.

In this manner, the optical packet switching system according to the seventh embodiment can switch the detection mode between the detection of bit error based on the BIP and the detection of bit error based on the FEC code. Since FEC generally requires more sophisticated arithmetic processing capabilities than BIP, the circuit scale of FEC is larger than that of BIP and therefore the power consumed by FEC is larger than that by BIP. Thus, the optical packet switching system can be efficiently operated by using either BIP or FEC as necessary. For example, a flexible system operation may be performed such that the bit error is monitored and corrected using the FEC if the packet signals are transmitted over a long distance while the power consumption is suppressed using the BIP if the packet signals are transmitted over a short distance.

(Eighth Embodiment)

A description is now given of an optical packet switching system according to an eighth embodiment of the present invention.

Figure 20:
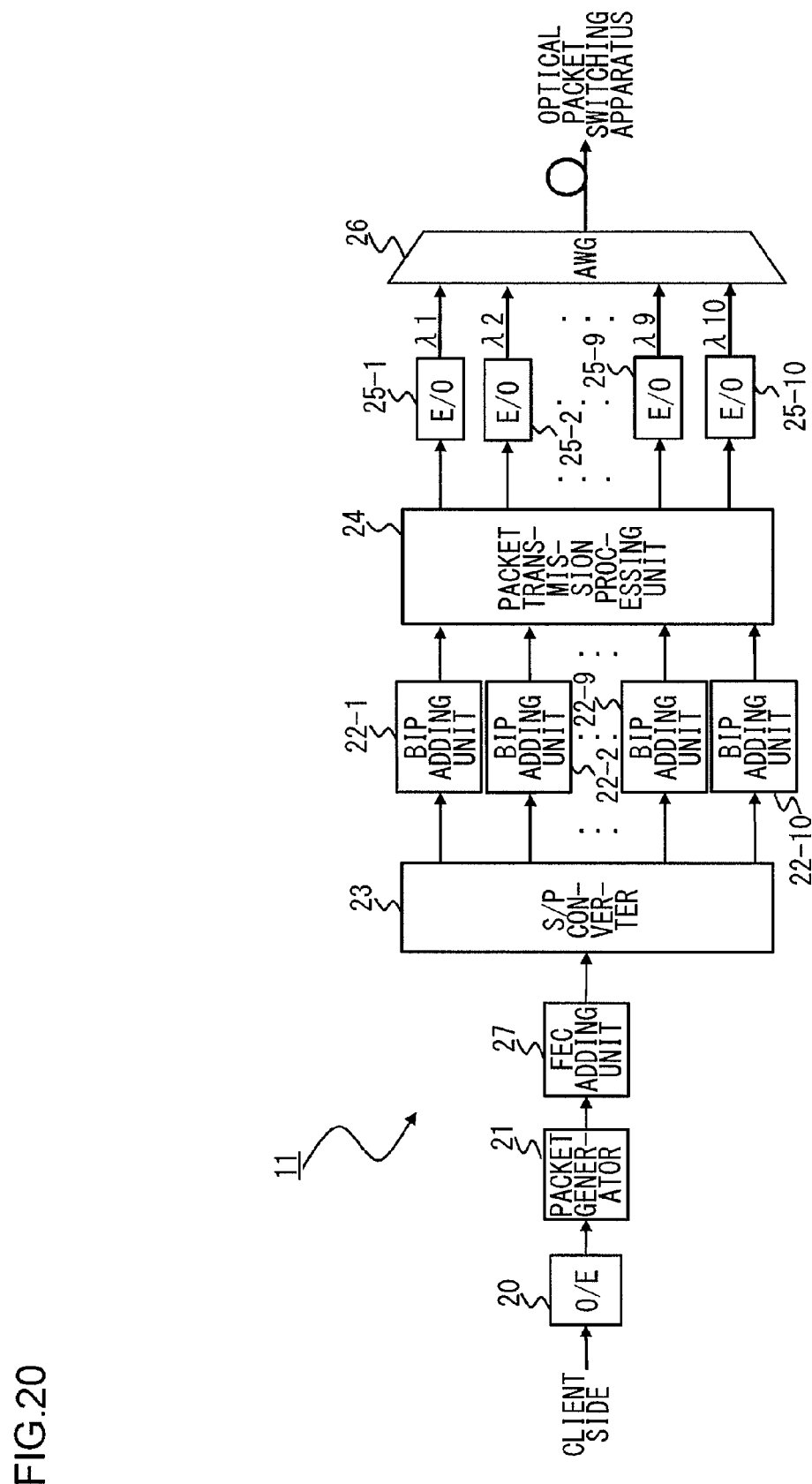
FIG. 20 illustrates a structure of an optical packet transmitting apparatus according to an eighth embodiment of the present invention.

FIG. 20 illustrates a structure of an optical packet transmitting apparatus 11 according to the eighth embodiment of the present invention. In the optical packet transmitting apparatus 11 according to the present embodiment, the FEC adding unit 27 is provided before the serial/parallel converter 23. Also, the first to tenth BIP adding units 22-1 to 22-10 are provided subsequent to the serial/parallel converter 23.

In the optical packet transmitting apparatus 11 according to the present embodiment, the packet signal outputted from the packet generator 21 is inputted to the FEC adding unit 27. The FEC adding unit 27 adds an FEC code to the packet signal and outputs the FEC-code-added packet signal to the serial/parallel converter 23. Ten divided packet signals outputted from the serial/parallel converter 23 are inputted to the first to tenth BIP adding units 22-1 to 22-10. Each of the first to tenth BIP adding units 22-1 to 22-10 adds BIP to each of the inputted divided packet signals and each outputs the BIP-added divided packet signal to the packet transmission processing unit 24.

FIG. 21 illustrates a structure of an optical packet receiving apparatus 13 apparatus according to the eighth embodiment of the present invention. In the optical packet receiving apparatus 13 according to the present embodiment, the first to tenth BIP comparison units 54-1 to 54-10 are provided before the parallel/serial converter 53. Also, the FEC correction unit 57 is provided subsequent to the parallel/serial converter 53.

In the optical packet receiving apparatus 13 according to the present invention, ten divided packet signals outputted from the first to tenth optical-to-electrical converters 52-1 to 52-10 are inputted to the first to tenth BIP comparison units 54-1 to 54-10. Each of the first to tenth BIP comparison units 54-1 to 54-10 detects the bit error rate of inputted divided packet signal, based on the BIP added to the inputted divided packet signal. The ten divided packet signals outputted from the first to tenth BIP comparison units 54-1 to 54-10 are inputted to the parallel/serial converter 53. The parallel/serial converter 53 converts the ten inputted divided packet signals into a serial packet signal and then outputs the serial packet signal to the FEC correction unit 57. The FEC correction unit 58 detects the bit error rate of the packet signal based on the FEC code added to the inputted serial packet signal and corrects the bit error thereof.

In this manner, by employing the optical packet switching system according to the present embodiment, the bit error rate of each of the optical packet signals of wavelengths $\lambda 1$ to $\lambda 10$ can be detected by using the first to tenth BIP adding units 22-1 to 22-10 and the first to tenth BIP comparison units 54-1 to 54-10. Also, the FEC adding unit 27 and the FEC correction unit 57 can not only detect the bit error rate of the serial packet signal as a whole but also correct the bit error thereof.

The present invention has been described based upon various illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An optical packet switching system, comprising:
   an optical packet switching apparatus configured to extract routing information from an inputted optical packet signal and configured to switch a route of the packet signal;
   an optical packet transmitting apparatus configured to generate an optical packet signal by adding the routing information to a received client signal and configured to send out the generated optical packet signal to the optical packet switching apparatus;
   an optical packet receiving apparatus configured to receive the optical packet signal sent out from the optical packet switching apparatus,
   the optical packet transmitting apparatus including:
      a packet generator configured to generate a packet signal by adding the routing information to the received client signal;
      a packet quality information adding unit configured to add packet quality information, by which to detect error occurrence in the packet signal, to the generated packet signal; and
      an electrical-to-optical converter configured to convert the packet signal, to which the packet quality information has been added, into the optical packet signal and configured to send out the optical packet signal;
      a first converter configured to convert the inputted packet signal into a plurality of divided packet signals, the first converter being provided subsequent to the packet quality information adding unit;
      a plurality of the electrical-to-optical converters provided subsequent to the first converter; and a wavelength multiplexing unit configured to multiplex optical packet signals of a plurality of wavelengths outputted from the plurality of the electrical-to-optical converters, and the optical packet receiving apparatus including:
an optical-to-electrical converter configured to convert the received optical packet signal into an electrical packet signal; and
a packet quality detector configured to detect error occurrence in the packet signal, based on the packet quality information added to the packet signal, and
a wavelength division unit configured to demultiplex the received wavelength-multiplexed optical packet signal into optical packets of a plurality of wavelengths; and
a plurality of the optical-to-electrical converters provided subsequent to the wavelength division unit; and
a second converter configured to convert the plurality of divided packet signals from the plurality of the electrical-to-optical converters into a serial packet signal, the second converter being provided anterior to the packet quality detector.

2. An optical packet switching system, comprising:
an optical packet switching apparatus configured to extract routing information from an inputted optical packet signal and configured to switch a route of the packet signal;
an optical packet transmitting apparatus configured to generate an optical packet signal by adding the routing information to a received client signal and configured to send out the generated optical packet signal to the optical packet switching apparatus;
an optical packet receiving apparatus configured to receive the optical packet signal sent out from the optical packet switching apparatus,
the optical packet transmitting apparatus including:
a packet generator configured to generate a packet signal by adding the routing information to the received client signal;
a packet quality information adding unit configured to add packet quality information, by which to detect error occurrence in the packet signal, to the generated packet signal; and
an electrical-to-optical converter configured to convert the packet signal, to which the packet quality information has been added, into the optical packet signal and configured to send out the optical packet signal, and
the optical packet receiving apparatus including:
an optical-to-electrical converter configured to convert the received optical packet signal into an electrical packet signal; and
a packet quality detector configured to detect error occurrence in the packet signal, based on the packet quality information added to the packet signal, and
the optical packet transmitting apparatus further including:
a first converter configured to convert the inputted packet signal into a plurality of divided packet signals;
a plurality of the packet quality information adding units provided subsequent to the first converter;
a plurality of the electrical-to-optical converters provided subsequent to the plurality of the packet quality information adding units; and
a wavelength multiplexing unit configure to multiplex optical packet signals of a plurality of wavelengths outputted from the plurality of the electrical-to-optical converters, and the optical packet receiving apparatus further including:
a wavelength division unit configured to demultiplex the received wavelength-multiplexed optical packet signal into optical packets of a plurality of wavelengths; and
a plurality of the optical-to-electrical converters provided subsequent to the wavelength division unit;
a plurality of the packet quality detectors provided subsequent to the plurality of the optical-to-electrical converters; and
a second converter configured to convert the plurality of divided packet signals from the plurality of the packet quality detectors into a serial packet signal.

3. The optical packet switching system according to claim 1, wherein the packet quality information adding unit includes a BIP (bit interleaved parity) adding units for computing bit interleaved parity of the inputted divided packet signal and for adding a computation result to the packet signal as packet quality information, and
wherein the packet quality detector includes a BIP comparison unit for detecting a bit error rate of the packet signal in such a manner that a bit interleaved parity added to the inputted divided packet signal and the bit interleaved parity computed for the inputted packet signal are compared with each other.

4. The optical packet switching system according to claim 1, wherein the packet quality information adding unit includes an FEC adding unit for adding an FEC (forward error correction) code to the inputted packet signal as packet quality information, and
wherein the packet quality detector includes an FEC correction unit for detecting the bit error rate of the inputted packet signal based on the FEC code added to the inputted packet signal and for correcting a bit error of the packet signal.

5. The optical packet switching system according to claim 1, the packet quality information adding unit including:
a BIP (bit interleaved parity) adding unit for computing bit interleaved parity of the inputted divided packet signal and for adding a computation result to the packet signal as the packet quality; and
an FEC adding unit for adding an FEC code to the inputted packet signal as packet quality information,
wherein the BIP adding unit and the FEC adding unit are provided in series with each other, and
the packet quality detector including:
a BIP comparison unit for detecting a bit error rate of the packet signal in such a manner that a bit interleaved parity added to the inputted divided packet signal and the bit interleaved parity computed for the inputted packet signal are compared with each other; and
an FEC correction unit for detecting the bit error rate of the inputted packet signal based on the FEC code added to the inputted packet signal and for correcting a bit error of the packet signal,
wherein the BIP comparison detector and the FEC correction unit are provided in series with each other.

6. The optical packet switching system according to claim 1, the packet quality information adding unit including:
a BIP (bit interleaved parity) adding unit for computing bit interleaved parity of the inputted divided packet signal and for adding a computation result to the packet signal as the packet quality; and
an FEC adding unit for adding an FEC code to the inputted packet signal as packet quality information,
wherein the BIP adding unit and the FEC adding unit are provided in parallel with each other, the packet quality detector including:
  a BIP comparison unit for detecting a bit error rate of the packet signal in such a manner that a bit interleaved parity added to the inputted divided packet signal and the bit interleaved parity computed for the inputted packet signal are compared with each other; and
  an FEC correction unit for detecting the bit error rate of the inputted packet signal based on the FEC code added to the inputted packet signal and for correcting a bit error of the packet signal,
  wherein the BIP comparison detector and the FEC correction unit are provided in parallel with each other.

7. The optical packet switching system according to claim 6, wherein the optical packet transmitting apparatus further includes a first operation control unit configured to activate either the BIP adding unit or the FEC adding unit, and
  wherein the optical packet receiving unit further includes a second operation control unit configured to activate either the BIP comparison unit or the FEC correction unit.

8. An optical packet switching system, comprising:
  an optical packet switching apparatus configured to extract routing information from an inputted optical packet signal and configured to switch a route of the packet signal;
  an optical packet transmitting apparatus configured to generate an optical packet signal by adding the routing information to a received client signal and configured to send out the generated optical packet signal to the optical packet switching apparatus;
  an optical packet receiving apparatus configured to receive the optical packet signal sent out from the optical packet switching apparatus,
  the optical packet transmitting apparatus including:
    a packet generator configured to generate a packet signal by adding the routing information to the received client signal;
    a packet quality information adding unit configured to add packet quality information, by which to detect error occurrence in the packet signal, to the generated packet signal; and
    an electrical-to-optical converter configured to convert the packet signal, to which the packet quality information has been added, into the optical packet signal and configured to send out the optical packet signal, and
  the optical packet receiving apparatus including:
    an optical-to-electrical converter configured to convert the received optical packet signal into an electrical packet signal; and
    a packet quality detector configured to detect error occurrence in the packet signal, based on the packet quality information added to the packet signal, and
  the optical packet transmitting apparatus further including:
    a first converter configured to convert the inputted packet signal into a plurality of divided packet signals;
    a plurality of the electrical-to-optical converters configured to convert a plurality of divided packet signals into optical packet signals of a plurality of wavelengths; and
    a wavelength multiplexing unit configured to multiplex optical packet signals of a plurality of wavelengths outputted from the plurality of the electrical-to-optical converters,
  the packet quality information adding unit including:
    an FEC adding unit for adding an FEC code to the inputted packet signal as packet quality information, the FEC adding unit being provided anterior to the serial/parallel converter; and
    a plurality of BIP (bit interleaved parity) adding units for computing bit interleaved parity of the inputted divided packet signals and for adding a computation result to the divided packet signals as packet quality information, the plurality of BIP adding units being provided subsequent to the first converter,
  the optical packet receiving apparatus further including:
    a wavelength division unit configured to demultiplex the received wavelength-multiplexed optical packet signal into optical packet signals of a plurality of wavelengths; and
    a plurality of the optical-to-electrical converters configured to output a plurality of divided packet signals, the plurality of the optical-to-electrical converters being provided subsequent to the wavelength division unit; and
    a second converter configured to convert the plurality of inputted divided packet signals into a serial packet signal, and
  the packet quality detector including:
    a BIP comparison unit, provided anterior to the parallel/serial converter, for detecting a bit error rate of the divided packet signals in such a manner that a bit interleaved parity added to the inputted divided packet signals and the bit interleaved parity computed for the inputted packet signals are compared with each other; and
    an FEC correction unit, provided subsequent to the second converter, for detecting the bit error rate of the packet signal based on the FEC code added to the inputted packet signal and for correcting a bit error of the packet signal.

* * * * *